(12) United States Patent
Terazawa et al.

(10) Patent No.: US 8,213,437 B2
(45) Date of Patent: Jul. 3, 2012

(54) METHOD OF TRANSMITTING MODULATED SIGNALS MULTIPLEXED BY FREQUENCY DIVISION MULTIPLEXING AND PHYSICAL QUANTITY DETECTOR USING THIS METHOD

(75) Inventors: Tomohito Terazawa, Okazaki (JP); Takamoto Watanabe, Nagoya (JP)

(73) Assignee: Denso Corporation, Kariya (JP)

( * ) Notice: Subject to any disclaimer, the term of this patent is extended or adjusted under 35 U.S.C. 154(b) by 414 days.

(21) Appl. No.: 12/462,043

(22) Filed: Jul. 28, 2009

(65) Prior Publication Data

US 2010/0054281 A1     Mar. 4, 2010

(30) Foreign Application Priority Data

Sep. 3, 2008 (JP) .................................. 2008-226405

(51) Int. Cl.
*H04L 7/08* (2006.01)
(52) U.S. Cl. .................. 370/395.62; 370/507; 375/326; 375/354; 375/357; 375/369
(58) Field of Classification Search .................. None
See application file for complete search history.

(56) References Cited

U.S. PATENT DOCUMENTS

| 2003/0039325 | A1* | 2/2003 | Watanabe ............. 375/346 |
| 2005/0047526 | A1 | 3/2005 | Watanabe et al. |

FOREIGN PATENT DOCUMENTS

| JP | 2003-046390 | 2/2003 |
| JP | 2005-102129 | 4/2005 |
| JP | 2007-205854 | 8/2007 |
| JP | 2007-225500 | 9/2007 |
| JP | 2007-225571 | 9/2007 |

* cited by examiner

*Primary Examiner* — Huy D Vu
*Assistant Examiner* — Zewdu A Beyen
(74) *Attorney, Agent, or Firm* — Harness, Dickey & Pierce, PLC

(57) ABSTRACT

A transmitting method has steps of modulating carrier waves having frequencies set at $\frac{1}{2}^{N-n}$ ($n \leq N$; n is a positive integer) of a reference frequency with transmission signals to produce modulated signals, multiplexing the modulated signals by frequency division multiplexing to produce an input signal, and transmitting the input signal to a synchronous detector in which the transmission signals are extracted from the input signal by calculating a moving average of the input signal every sampling period of time corresponding to the reference frequency and performing an addition and subtraction calculation corresponding to the cycle of each carrier wave for the moving averages. The frequency of each carrier wave, modulated with one transmission signal having a first signal level, is equal to or lower than the frequency of any carrier wave modulated with another transmission signal having a second signal level higher than the first signal level.

10 Claims, 15 Drawing Sheets

FIG. 5

DEMODULATION   N = 3
PROCESS $P_6: D_6 = +DT_1 - DT_2 - DT_3 + DT_4 + DT_5 - DT_6 - DT_7 + DT_8 + DT_9 - DT_{10} - DT_{11} + DT_{12} + DT_{13} - DT_{14} - DT_{15} + DT_{16}$
$P_5: D_5 = +DT_1 + DT_2 - DT_3 - DT_4 + DT_5 + DT_6 - DT_7 - DT_8 + DT_9 + DT_{10} - DT_{11} - DT_{12} + DT_{13} + DT_{14} - DT_{15} - DT_{16}$
$P_4: D_4 = +DT_1 + DT_2 - DT_3 - DT_4 - DT_5 - DT_6 + DT_7 + DT_8 + DT_9 + DT_{10} - DT_{11} - DT_{12} - DT_{13} - DT_{14} + DT_{15} + DT_{16}$
$P_3: D_3 = +DT_1 + DT_2 + DT_3 + DT_4 - DT_5 - DT_6 - DT_7 - DT_8 + DT_9 + DT_{10} + DT_{11} + DT_{12} - DT_{13} - DT_{14} - DT_{15} - DT_{16}$
$P_2: D_2 = +DT_1 + DT_2 + DT_3 + DT_4 + DT_5 + DT_6 + DT_7 + DT_8 - DT_9 - DT_{10} - DT_{11} - DT_{12} - DT_{13} - DT_{14} - DT_{15} - DT_{16}$
$P_1: D_1 = +DT_1 + DT_2 + DT_3 + DT_4 + DT_5 + DT_6 + DT_7 + DT_8 + DT_9 + DT_{10} + DT_{11} + DT_{12} + DT_{13} + DT_{14} + DT_{15} + DT_{16}$

| DEMODULATION PROCESS | ST$_1$ | ST$_2$ | ST$_3$ | ST$_4$ | ST$_5$ | ST$_6$ |
|---|---|---|---|---|---|---|
| ⇧ P$_6$ | × | × | × | × | × | ○ |
| ⇧ P$_5$ | × | × | × | × | ○ | × |
| ⇧ P$_4$ | × | × | × | ○ | × | × |
| ⇧ P$_3$ | × | × | ○ | × | × | × |
| ⇧ P$_2$ | × | ○ | × | × | × | × |
| ⇧ P$_1$ | ○ | × | × | × | × | × |

○ : REMAIN
× : DISAPPEAR

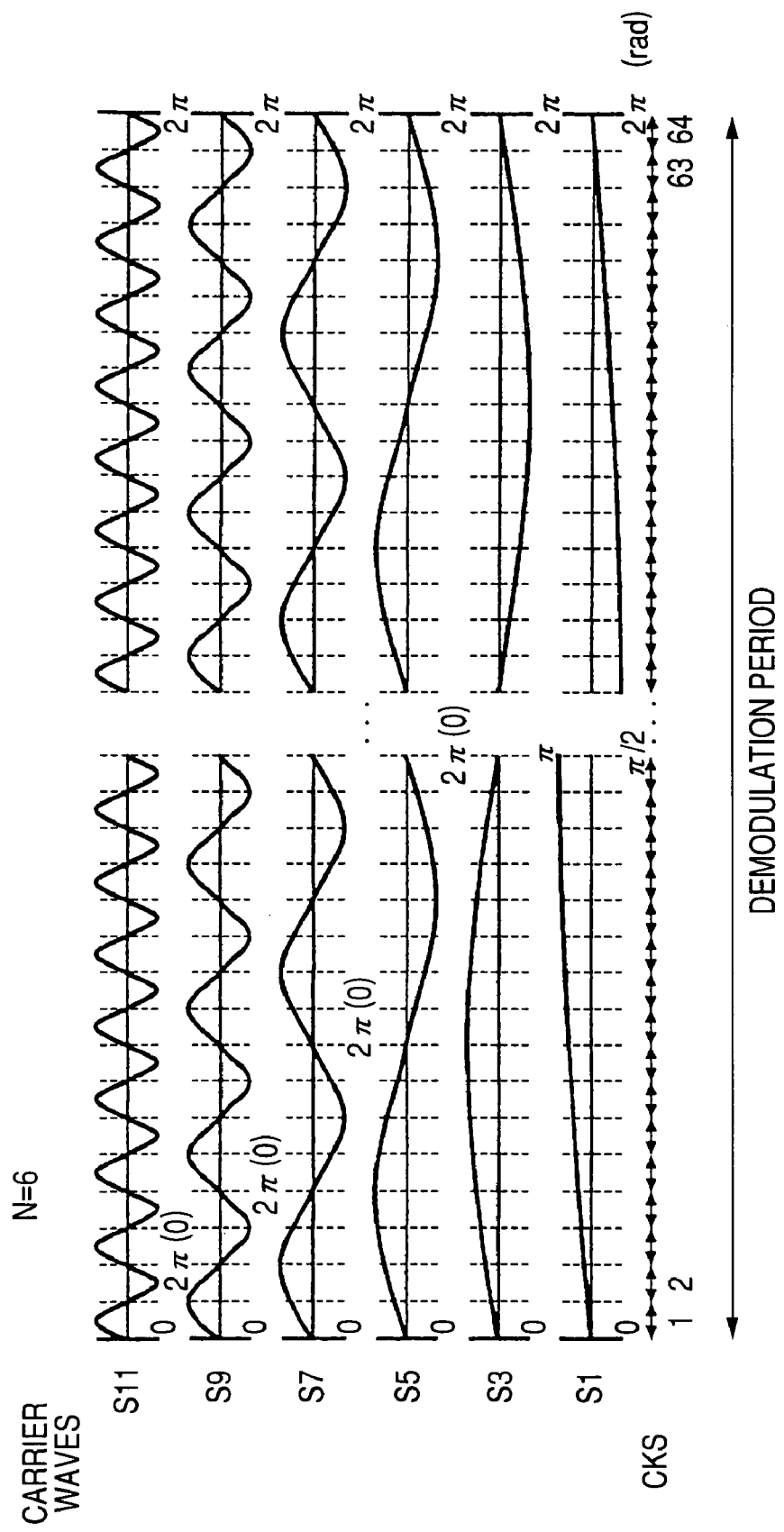

FIG. 8

DEMODULATION   N = 6
PROCESS $P_{11}: D_{11} = +DT_1 - DT_2 + DT_3 - DT_4 + DT_5 - DT_6 - DT_7 + DT_8 - \ldots + DT_{57} - DT_{58} - DT_{59} - DT_{60} + DT_{61} - DT_{62} + DT_{63} - DT_{64}$
$P_9: D_9 = +DT_1 + DT_2 - DT_3 - DT_4 + DT_5 + DT_6 - DT_7 - DT_8 + \ldots + DT_{57} + DT_{58} - DT_{59} - DT_{60} + DT_{61} + DT_{62} - DT_{63} - DT_{64}$
$P_7: D_7 = +DT_1 + DT_2 + DT_3 + DT_4 - DT_5 - DT_6 - DT_7 - DT_8 + \ldots + DT_{57} + DT_{58} + DT_{59} + DT_{60} - DT_{61} - DT_{62} - DT_{63} - DT_{64}$
$P_5: D_5 = +DT_1 + DT_2 + DT_3 + DT_4 + DT_5 + DT_6 + DT_7 + DT_8 + \ldots - DT_{57} - DT_{58} - DT_{59} - DT_{60} - DT_{61} - DT_{62} - DT_{63} - DT_{64}$
$P_3: D_3 = +DT_1 + DT_2 + DT_3 + DT_4 + DT_5 + DT_6 + DT_7 + DT_8 + \ldots - DT_{57} - DT_{58} - DT_{59} - DT_{60} - DT_{61} - DT_{62} - DT_{63} - DT_{64}$
$P_1: D_1 = +DT_1 + DT_2 + DT_3 + DT_4 + DT_5 + DT_6 + DT_7 + DT_8 + \ldots - DT_{57} - DT_{58} - DT_{59} - DT_{60} - DT_{61} - DT_{62} - DT_{63} - DT_{64}$

| DEMODULATION PROCESS | $ST_1$ | $ST_3$ | $ST_5$ | $ST_7$ | $ST_9$ | $ST_{11}$ |
|---|---|---|---|---|---|---|
| $P_{11}$ ⇧ | × | × | × | × | × | ○ |
| $P_9$ ⇧ | × | × | × | × | ○ | × |
| $P_7$ ⇧ | × | × | × | ○ | × | × |
| $P_5$ ⇧ | × | × | ○ | × | × | × |
| $P_3$ ⇧ | × | ○ | × | × | × | × |
| $P_1$ ⇧ | ○ | × | × | × | × | × |

○ : REMAIN
× : DISAPPEAR

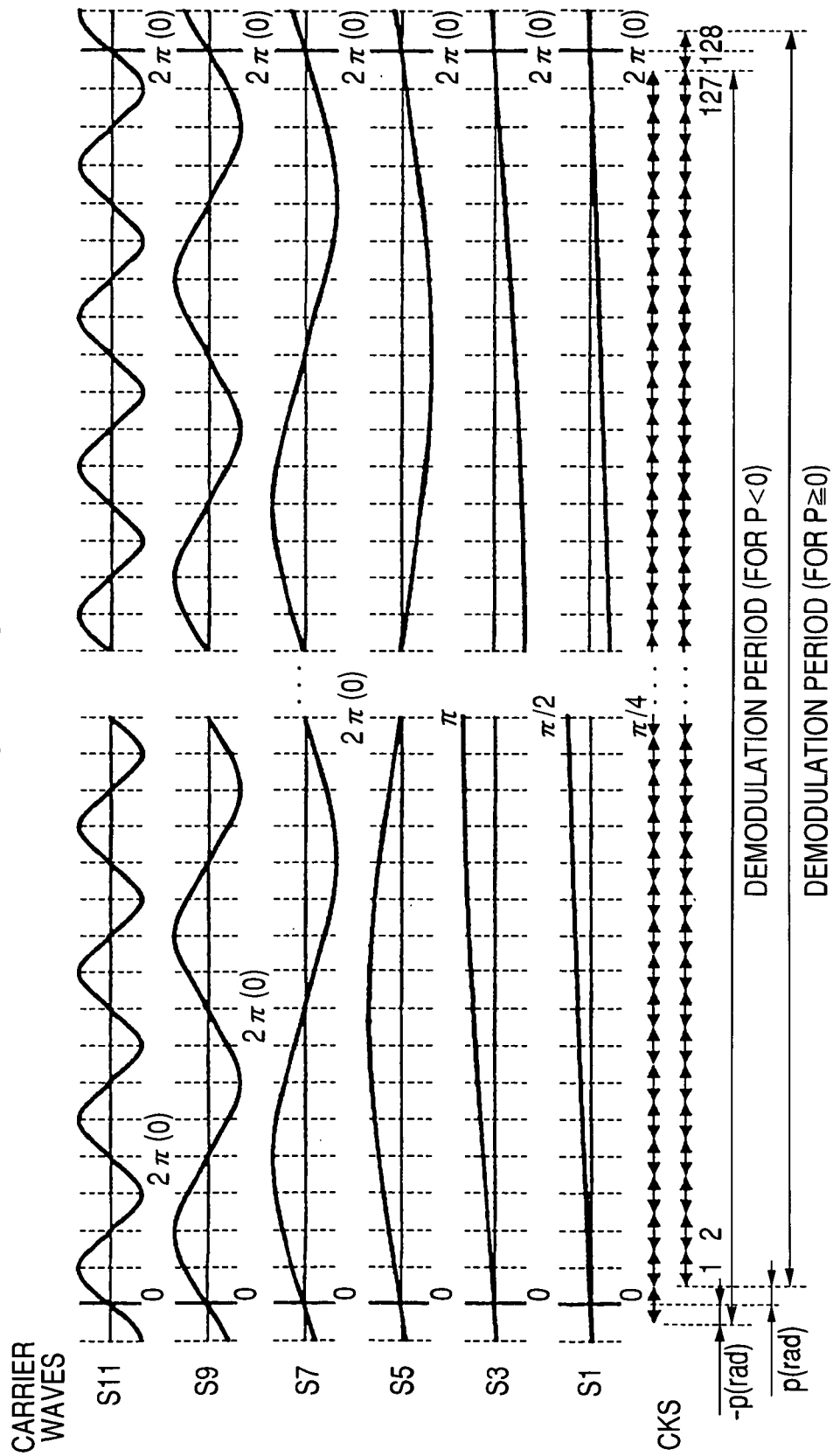

FIG. 11

$$DP_{11} \begin{cases} I_{11} = +DT_1 + DT_2 - DT_3 - DT_4 + DT_5 + DT_6 - DT_7 - DT_8 - \ldots + DT_{121} + DT_{122} - DT_{123} - DT_{124} + DT_{125} + DT_{126} - DT_{127} - DT_{128} \\ Q_{11} = +DT_1 - DT_2 - DT_3 + DT_4 + DT_5 - DT_6 - DT_7 + DT_8 + \ldots + DT_{121} - DT_{122} - DT_{123} + DT_{124} + DT_{125} - DT_{126} - DT_{127} + DT_{128} \end{cases}$$

$$DP_9 \begin{cases} I_9 = +DT_1 + DT_2 + DT_3 + DT_4 - DT_5 - DT_6 - DT_7 - DT_8 + \ldots + DT_{121} + DT_{122} + DT_{123} + DT_{124} - DT_{125} - DT_{126} - DT_{127} - DT_{128} \\ Q_9 = +DT_1 + DT_2 - DT_3 - DT_4 - DT_5 - DT_6 + DT_7 + DT_8 + \ldots + DT_{121} + DT_{122} - DT_{123} - DT_{124} - DT_{125} - DT_{126} + DT_{127} + DT_{128} \end{cases}$$

$$DP_7 \begin{cases} I_7 = +DT_1 + DT_2 + DT_3 + DT_4 + DT_5 + DT_6 + DT_7 + DT_8 + \ldots + DT_{121} + DT_{122} + DT_{123} + DT_{124} + DT_{125} + DT_{126} + DT_{127} + DT_{128} \\ Q_7 = +DT_1 + DT_2 + DT_3 + DT_4 + DT_5 - DT_6 + DT_7 - DT_8 - \ldots - DT_{121} - DT_{122} - DT_{123} - DT_{124} + DT_{125} + DT_{126} + DT_{127} + DT_{128} \end{cases}$$

$$DP_5 \begin{cases} I_5 = +DT_1 + DT_2 + DT_3 + DT_4 + DT_5 + DT_6 + DT_7 + DT_8 - \ldots - DT_{121} - DT_{122} - DT_{123} - DT_{124} + DT_{125} + DT_{126} + DT_{127} + DT_{128} \\ Q_5 = +DT_1 + DT_2 + DT_3 + DT_4 + DT_5 + DT_6 + DT_7 + DT_8 - \ldots - DT_{121} - DT_{122} + DT_{123} + DT_{124} - DT_{125} - DT_{126} + DT_{127} + DT_{128} \end{cases}$$

$$DP_3 \begin{cases} I_3 = +DT_1 + DT_2 + DT_3 + DT_4 + DT_5 + DT_6 + DT_7 + DT_8 - \ldots + DT_{121} + DT_{122} - DT_{123} - DT_{124} + DT_{125} + DT_{126} - DT_{127} - DT_{128} \\ Q_3 = +DT_1 + DT_2 + DT_3 + DT_4 + DT_5 + DT_6 + DT_7 + DT_8 + \ldots - DT_{121} - DT_{122} - DT_{123} - DT_{124} + DT_{125} - DT_{126} - DT_{127} + DT_{128} \end{cases}$$

$$DP_1 \begin{cases} I_1 = +DT_1 + DT_2 + DT_3 + DT_4 + DT_5 + DT_6 + DT_7 + DT_8 + \ldots + DT_{121} + DT_{122} + DT_{123} + DT_{124} + DT_{125} + DT_{126} + DT_{127} + DT_{128} \\ Q_1 = +DT_1 + DT_2 + DT_3 + DT_4 + DT_5 + DT_6 + DT_7 + DT_8 + \ldots + DT_{121} + DT_{122} + DT_{123} + DT_{124} + DT_{125} + DT_{126} + DT_{127} + DT_{128} \end{cases}$$

FIG. 12

$DP_{11} \Rightarrow \sqrt{I_{11}^2 + Q_{11}^2}$ $DP_9 \Rightarrow \sqrt{I_9^2 + Q_9^2}$ $DP_7 \Rightarrow \sqrt{I_7^2 + Q_7^2}$ $DP_5 \Rightarrow \sqrt{I_5^2 + Q_5^2}$ $DP_3 \Rightarrow \sqrt{I_3^2 + Q_3^2}$ $DP_1 \Rightarrow \sqrt{I_1^2 + Q_1^2}$

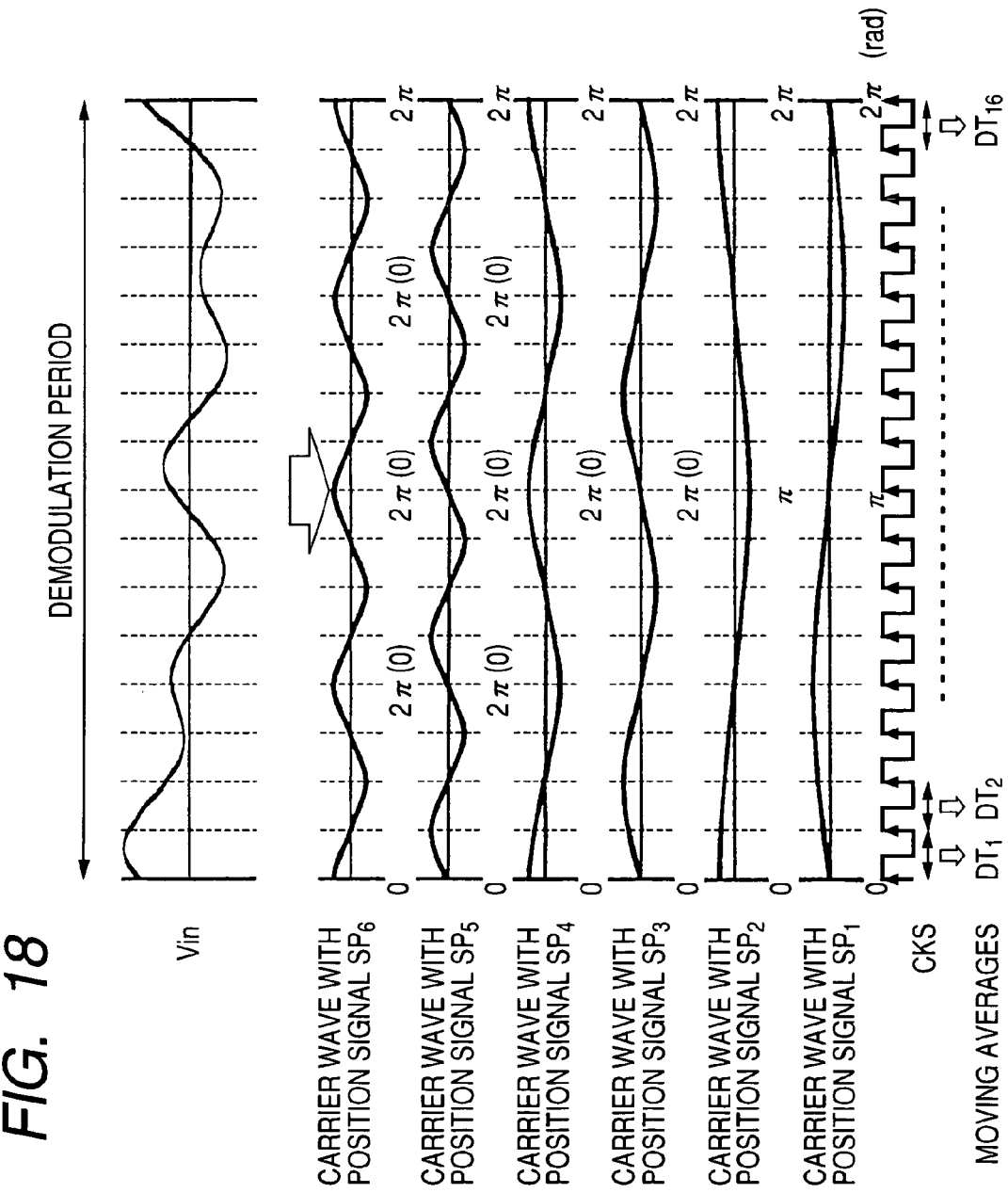

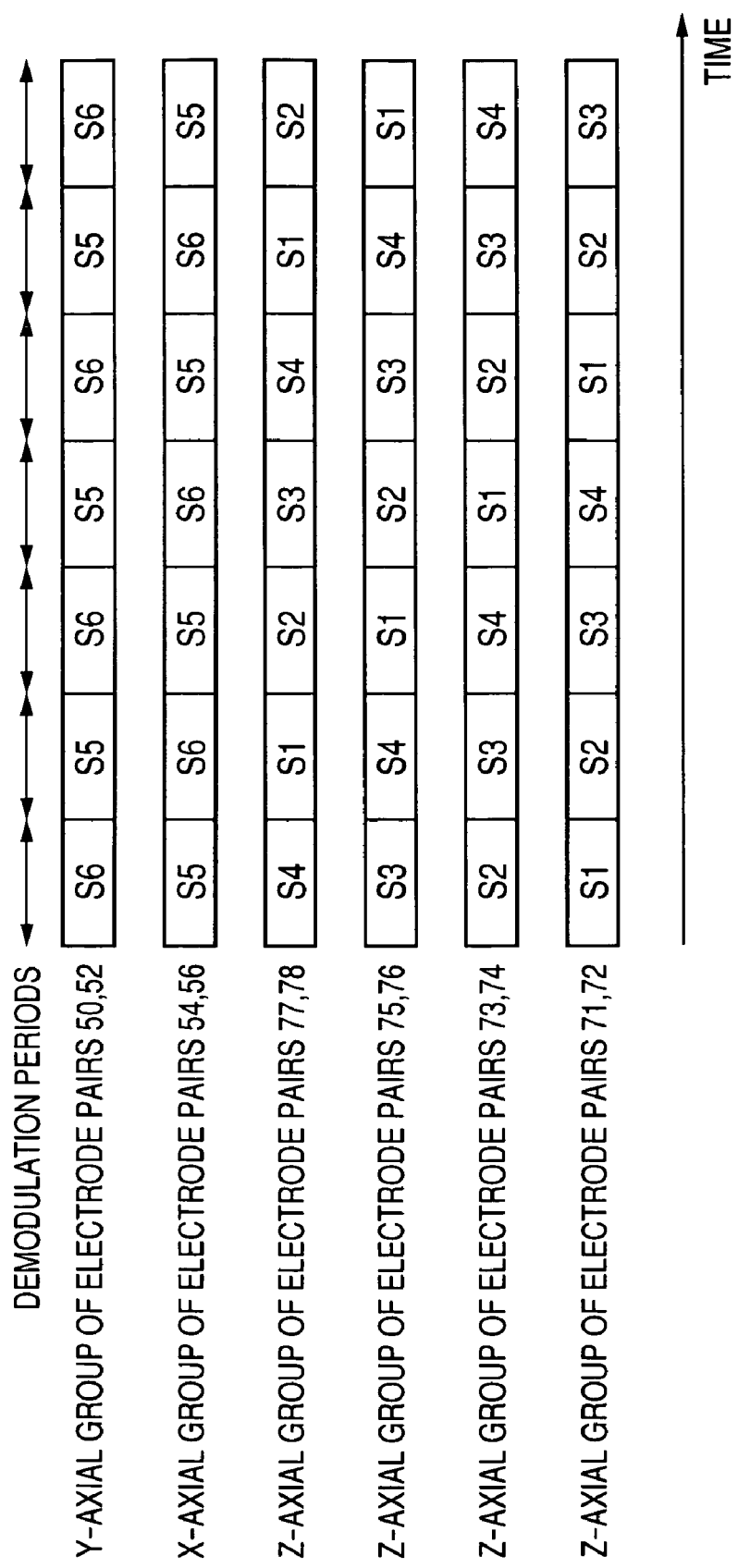

METHOD OF TRANSMITTING MODULATED SIGNALS MULTIPLEXED BY FREQUENCY DIVISION MULTIPLEXING AND PHYSICAL QUANTITY DETECTOR USING THIS METHOD

CROSS-REFERENCE TO RELATED APPLICATION

This application is based upon and claims the benefit of priority of the prior Japanese Patent Application 2008-226405 filed on Sep. 3, 2008, so that the contents of which are incorporated herein by reference.

BACKGROUND OF THE INVENTION

1. Field of the Invention

The present invention relates to a method of transmitting a plurality of modulated signals, obtained by modulating a plurality of carrier waves having frequencies with respective transmission signals and multiplexed to produce an input signal by frequency division multiplexing, to a synchronous detector (or a coherent detector), in which synchronous detection is performed to extract the transmission signal, corresponding to each modulated carrier wave of the input signal, from the input signal by calculating a moving average of the input signal every sampling period of time and performing an addition and subtraction calculation, corresponding to the cycle of the corresponding carrier wave, for the moving averages to obtain a level of the transmission signal.

The present invention also relates to a physical quantity detector for detecting a physical quantity by using this method.

2. Description of Related Art

For the transmission of a plurality of transmission signals multiplexed by frequency division multiplexing (FDM) or orthogonal frequency division multiplexing (OFDM), a plurality of carrier waves having different frequencies are modulated with the respective transmission signals to obtain modulated signals, and these modulated signals are multiplexed to produce an input signal in FDM or OFDM. This input signal is transmitted to a synchronous detector. In this detector, the synchronous detection is performed to extract the transmission signal, corresponding to each modulated carrier wave of the input signal, from the input signal.

When the synchronous detector is structured by analog circuits having operational amplifiers and analog filters, one analog circuit is required to extract one transmission signal from each modulated carrier wave. Therefore, the detector requires a large number of analog circuits, so that it is difficult to manufacture a small-sized detector. Further, the analog circuits are easily influenced by external noise, so that it is difficult to reproduce the transmission signals in the detector with high precision. Therefore, the use of the detector is limited to specific environments substantially having no external noises.

Because of the demerits of analog circuits in the synchronous detector, the synchronous detector is structured by digital circuits. For example, Published Japanese Patent First Publication No. 2005-102129 proposes a synchronous detector, structured by digital circuits, in which synchronous detection is performed to extract a transmission signal, corresponding to each modulated carrier wave of an input signal, from the input signal.

In this detector, a sampling period of time is defined to be equal to a half (or a quarter) of the cycle of the reference carrier wave having the highest frequency among carrier waves, and the moving average of the input signal is calculated every sampling period. Then, an addition and subtraction calculation corresponding to the cycle of each carrier wave is performed for the moving averages to extract the corresponding transmission signal from the input signal. More specifically, first moving averages calculated in the first half of the cycle of the carrier wave (i.e., positively oscillating phase range of carrier wave) are added to one another to obtain a summed value, and second moving averages calculated in the latter half of the cycle of the carrier wave (i.e., negatively oscillating phase range of carrier wave) are subtracted from the summed value to obtain a modulation result corresponding to the level of the corresponding transmission signal. Therefore, the transmission signals are extracted from the input signal.

To extract the transmission signals from the input signal in this detector, it is required to set frequencies of the carrier waves at $1/2^n$ (n=0,1,2, - - - ,N; N is a positive integer) of the reference frequency (i.e., the highest frequency) of the reference carrier wave. To calculate the moving averages of the input signal, the synchronous detector has a time analog-to-digital (A/D) converter with a pulse delay circuit, and this circuit has a series of delay units. Therefore, the detector can be structured without using any analog circuits such as operational amplifiers and analog filters and can simultaneously perform the synchronous detection to extract the transmission signal, corresponding to each modulated carrier wave of the input signal, from the input signal.

In this detector, each moving average inevitably has an error. Further, as the frequency of the carrier wave becomes lower, the number of moving averages for the addition and subtraction calculation in one cycle of the carrier wave is increased. Therefore, when a transmission signal is superimposed onto a carrier wave having a low frequency, errors of the moving averages added and subtracted in the calculation corresponding to the cycle of the carrier wave are effectively cancelled out. In this case, the error in the voltage level of the transmission signal extracted from the input signal becomes small, and the transmission signal can be extracted using the synchronous detection with high precision.

However, as the frequency of the carrier wave becomes higher, the number of moving averages for the addition and subtraction calculation in one cycle of the carrier wave is decreased. Therefore, when a transmission signal is superimposed onto a high frequency carrier wave, errors in the moving averages added and subtracted in the calculation corresponding to the cycle of the carrier wave are not effectively cancelled out. In this case, the error in the voltage level of the transmission signal extracted from the input signal becomes large, so that the precision of the transmission signal extracted in the synchronous detection is inevitably lowered.

More specifically, in the time A/D converter of the pulse delay circuit, a pulse signal is transmitted through each of the delay units arranged in series while being delayed in each delay unit, and the delay time in each of the delay units depends on the voltage level of the input signal. A sampling period of time is set to be a half (or a quarter) of the period $1/fc0$ of the reference carrier wave having the highest frequency $fc0$, and the number of delay units, through which the pulse signal is transmitted every sampling period, is counted. One moving average of the input signal is calculated from the counted value obtained every sampling period.

Therefore, each moving average inevitably has an error corresponding to a period of time shorter than the delay time of one delay unit. This error occurring in one moving average is added to the next moving average.

Further, in the synchronous detector, for each carrier wave, the moving averages of the input signal in the first half of one cycle of the carrier wave are added to one another to obtain a summed value, and the moving averages in the latter half of one cycle of the carrier wave are subtracted from the summed value to obtain a demodulation result corresponding to the level of the corresponding transmission signal. Therefore, when the frequency of the carrier wave is low, an adding period of time and a subtracting period of time in one cycle of the carrier wave are long, so that the number of moving averages in each half of the cycle of the carrier wave is increased. In this case, because the addition and subtraction calculations are performed for a large number of successively-calculated moving averages every cycle of the carrier wave, errors in the moving averages are effectively cancelled out every cycle of the carrier wave. Therefore, the synchronous detection for extracting the transmission signal modulating the low frequency carrier wave can be precisely performed.

In contrast, when the frequency of the carrier wave is high, the adding calculations and the subtracting calculations are alternately changed within a short period of time in each cycle of the carrier wave. In this case, an addition period of time and a subtraction period of time in each cycle of the carrier wave are short, so that the number of moving averages added to one another and the number of moving averages subtracted from the summed value every cycle of the carrier wave become low. Therefore, errors of the moving averages in one cycle of the carrier wave are not effectively cancelled out. As a result, the precision in the synchronous detection for extracting the transmission signal modulating the high frequency carrier wave is inevitably lowered.

As described above, in the synchronous detection of the carrier waves having different frequencies, when a transmission signal superimposed onto one carrier wave of a high frequency has a low voltage level so as to have a low signal-to-noise (S/N) ratio, the S/N ratio in the signal demodulated in the synchronous detection is further lowered. Therefore, the transmission signal superimposed onto the carrier wave of the high frequency cannot be reproduced in the demodulation with high precision.

An electrostatic floating type gyro representing a physical quantity detector has been disclosed in each of Published Japanese Patent First Publication No. 2005-140709 and Published Japanese Patent First Publication No. 2005-214948. In this gyro, a gyro rotor electrostatically floats in a gyro case and is can rotate. Two electrostatic electrodes are attached to the case along an x-axis in a pair to apply an electrostatic force on the rotor along the x-axis. The electrostatic capacity between this electrode pair and the rotor is changed in response to the movement of the rotor along the x-axis. In the same manner, a pair of electrostatic electrodes is attached to the case along a y-axis, and three pairs of electrostatic electrodes are attached to the case along a z-axis. The rotor is moved in the case in response to the acceleration applied to the case along each axis, the angular velocity around the x-axis and the angular velocity around the y-axis.

A control voltage is applied to each pair of electrostatic electrodes to hold the rotor at a predetermined position within the case. A carrier wave is also applied to each pair of electrostatic electrodes to be superimposed onto the corresponding control voltage. When an acceleration and an angular velocity are applied to the case, the position of the rotor relative to the case is moved, and the voltage applied to the rotor from each pair of electrostatic electrodes is changed due to a change of the capacitance coupling between the rotor and the pair of electrostatic electrodes. This gyro detects the acceleration and the angular velocity from a change of the voltages applied to the rotor from the pairs of electrostatic electrodes.

However, in this gyro, when the control voltage is superimposed onto one high frequency carrier wave, a displacement detecting signal cannot be received from the rotor with high precision. Especially, when the control voltage is low, the signal-to-noise (S/N) ratio of the displacement detecting signal is further lowered. Therefore, the acceleration and the angular velocity cannot be detected with sufficiently high precision.

SUMMARY OF THE INVENTION

An object of the present invention is to provide, with due consideration to the drawbacks of the conventional method of transmitting modulated signals multiplexed by frequency division multiplexing, a method of transmitting a plurality of modulated signals, obtained by modulating a plurality of carrier waves having frequencies with respective transmission signals and multiplexed to produce an input signal by frequency division multiplexing, to a synchronous detector, in which synchronous detection is performed to extract the transmission signal, corresponding to each modulated carrier wave of the input signal, from the input signal by calculating a moving average of the input signal every sampling period of time and performing addition and subtraction corresponding to the cycle of the corresponding carrier wave for the moving averages, so as to reproduce the transmission signals in the synchronous detector with high precision regardless of levels of the transmission signals.

The object of the present invention is also to provide a physical quantity detector for detecting a physical quantity by using this method.

According to an aspect of this invention, the object is achieved by the provision of a method of transmitting a plurality of modulated signals multiplexed by frequency division multiplexing, comprising the steps of (1) preparing a plurality of transmission signals, (2) modulating a plurality of carrier waves having frequencies set at $½^{N-n}$ (n is a variable positive integer equal to or lower than a positive integer N) of a reference frequency with the respective transmission signals to produce the modulated signals having respective modulated carrier waves, (3) multiplexing the modulated signals by the frequency division multiplexing to produce an input signal, and (4) transmitting the input signal to a synchronous detector in which synchronous detection is performed to extract the transmission signal, corresponding to each modulated carrier wave of the input signal, from the input signal by calculating a moving average of the input signal every sampling period of time equal to one-half or one-fourth of a reference cycle corresponding to the reference frequency and performing an addition and subtraction calculation corresponding to a cycle of the corresponding carrier wave for the moving averages to detect a signal level of the transmission signal. The step of modulating the carrier waves includes setting the frequency of each carrier wave, modulated with one transmission signal having a first signal level, to be lower than the frequency of any carrier wave modulated with another transmission signal having a second signal level higher than the first signal level.

In these steps of the method, the transmission signals are superimposed onto the carrier waves to produce the modulated signals, these modulated signals are multiplexed to the input signal by the frequency division multiplexing, and this input signal is transmitted to the synchronous detector. In this detector, a moving average of the input signal is calculated every sampling period. Then, the addition and subtraction calculation corresponding to the cycle of each carrier wave is performed for the moving averages to detect the level of the transmission signal superimposed onto the carrier wave. Therefore, the transmission signals are extracted from the input signal in the detector.

In the addition and subtraction calculation, as the frequency of the carrier wave is lowered, the addition period and the subtraction period for the moving averages are lengthened, and the number of moving averages in one cycle of the carrier wave is increased. Further, each moving average of the input signal has an error.

Therefore, as the frequency of the carrier wave is lowered, errors occurring in the moving averages can effectively be cancelled out every cycle of the carrier wave. In contrast, as the frequency of the carrier wave is heightened, the cancellation of errors of the moving averages in each cycle of the carrier wave becomes more insufficient. Accordingly, as the frequency of the carrier wave modulated with the transmission signal is lowered, the precision of the transmission signal extracted in the synchronous detection can be heightened.

Further, the transmission signals have various signal levels. As the signal level of the transmission signal is lowered, the signal-to-noise (S/N) ratio in the extracted transmission signal becomes worse.

In the present invention, the frequency of each carrier wave, modulated with one transmission signal having a first signal level, is set to be lower than the frequency of any carrier wave modulated with another transmission signal having a second signal level higher than the first signal level. Therefore, as the level of the transmission signal becomes low, the precision of the transmission signal extracted by the synchronous detection is heightened.

Accordingly, even when the transmission signal has a low level, the transmission signal can be extracted from the input signal with a sufficiently high precision. Further, even when the transmission signal having a high level is extracted by the synchronous detection with low precision, the transmission signal can be appropriately extracted from the input signal at a sufficiently high S/N ratio.

According to another aspect of this invention, the object is also achieved by the provision of a physical quantity detector comprising a case, an object disposed in a space of the case, a first force inducing member, a second force inducing member, a voltage signal supplying unit, a carrier wave applying unit, a synchronous detecting unit, and a control unit.

The case is subjected to acceleration and/or angular velocity, and the object moves relative to the case in response to the acceleration and/or the angular velocity applied to the case.

The voltage signal supplying unit supplies a first voltage signal to the first force inducing member to position the object in a first direction by applying an electrostatic force, induced by the first force inducing member in response to the first voltage signal and applied to the object, and to produce a first position signal, of which the voltage level indicates the position of the object in the first direction, in the object and supplies a second voltage signal to the second force inducing member to position the object in a second direction perpendicular to the first direction by electrostatic force, induced by the second force inducing member in response to the second voltage signal and applied to the object, and to produce a second position signal, of which the voltage level indicates the position of the object in the second direction, in the object.

The carrier wave applying unit applies a plurality of carrier waves having frequencies to the respective force inducing members to apply the carrier waves to the object through the force inducing members, an input signal being produced in the object by modulating the carrier wave applied to the object through each force inducing member with the position signal corresponding to the force inducing member to produce a plurality of modulated signals having modulated carrier waves and multiplexing the modulated signals by frequency division multiplexing. The carrier wave applying unit sets the frequencies of the carrier waves at $\frac{1}{2}^{N-n}$ (n is a variable positive integer equal to or lower than a positive integer N) of a reference frequency. The carrier wave applying unit sets the frequency of the carrier wave applied to the second force inducing member corresponding to the angular velocity detected by the control unit to be equal to or lower than the frequency of the carrier wave applied to the first force inducing member corresponding to the acceleration detected by the control unit.

The synchronous detecting unit receives the input signal transmitted from the object and performs synchronous detection to extract the position signal, corresponding to each modulated carrier wave of the input signal, from the input signal. The synchronous detecting unit calculates a moving average of the input signal every sampling period of time equal to one-half or one-fourth of a reference cycle corresponding to the reference frequency and performs an addition and subtraction calculation corresponding to a cycle of each carrier wave for the moving averages to detect a signal level of the position signal modulating the carrier wave.

The control unit controls, according to the position signals extracted by the synchronous detecting unit, the voltage signal supplying unit to adjust the voltage signals supplied to the force inducing members and to hold the object, to which the electrostatic forces are applied according to the adjusted voltage signals, at a predetermined position in the case, detects a strength of acceleration applied to the case along the first direction, as a physical quantity, from the first position signal corresponding to the first force inducing member, and detects the level of angular velocity applied to the case around the first direction or a third direction perpendicular to the first and second directions, as another physical quantity, from the second position signal corresponding to the second force inducing member.

With this structure of the detector, when the case is subjected to acceleration and/or angular velocity, the object moves relative to the case in response to the acceleration and/or the angular velocity. To hold the object at a predetermined position in the case against the acceleration and/or the angular velocity, the control unit always controls, based on the position of the object in the case, the voltage signal supplying unit to adjust voltage signals supplied to the respective force inducing members. In response to these signals, electrostatic forces are applied from the force inducing members to the object to hold the object at the predetermined position. Further, the carrier wave applying unit applies carrier waves to the respective force inducing members, and these waves are applied from the members to the object due to capacity coupling.

However, even when the control unit controls the voltage signal supplying unit, the object is placed at a position different from the predetermined position in response to acceleration and/or angular velocity still applied to the case. Further, the level of voltage of the object caused by the electrostatic forces depends on the position of the object relative to each force inducing member. Therefore, a first position signal indicating a position of the object in the first direction (e.g., x-axis) is substantially produced in the object from the electrostatic force applied from the first force inducing member to the object, and a second position signal indicating a position of the object in the second direction (e.g., z-axis) is substantially produced in the object in response to the electrostatic force applied from the second force inducing member to the object.

The carrier wave applied to the first force inducing member is modulated with the first position signal in the object, and the carrier wave applied to the second force inducing member is modulated with the second position signal in the object. An input signal is produced in the object from the modulated signals multiplexed by frequency division multiplexing.

The synchronous detecting unit receives the input signal, and performs the synchronous detection to extract the position signal, corresponding to each modulated carrier wave of the input signal, from the input signal. The control unit detects the strength of acceleration applied to the case along the first direction from the first position signal and detects the level of angular velocity applied to the case around the first direction or the third direction (e.g., y-axis) from the second position signal. Further, the control unit controls the voltage signal supplying unit according to these position signals to hold the object at the predetermined position.

Therefore, the detector can detect physical quantities such as the strength of acceleration and the level of the angular velocity applied to the case.

Further, as compared with the precision of the first position signal corresponding to the detection of the acceleration in the synchronous detection, it is required to heighten the precision of the second position signal corresponding to the detection of the angular velocity in the synchronous detection. In the present invention, the frequency of the carrier wave applied to the second force inducing member corresponding to the angular velocity is set to be equal to or lower than the frequency of the carrier wave applied to the first force inducing member corresponding to the acceleration.

Accordingly, the detector can detect the angular velocity with sufficiently high precision.

BRIEF DESCRIPTION OF THE DRAWINGS

FIG. 5 is an explanatory view showing an addition and subtraction calculation corresponding to each carrier wave performed as a demodulation process according to the first embodiment;

FIG. 6 is an explanatory view showing one transmission signal reproduced in each demodulation process;

FIG. 7 is an explanatory view showing carrier waves to be modulated with transmission signals according to the modification of the first embodiment;

FIG. 8 is an explanatory view showing an addition and subtraction calculation corresponding to each carrier wave performed as a demodulation process according to the modification of the first embodiment;

FIG. 9 is an explanatory view showing one transmission signal reproduced in each demodulation process;

FIG. 10 is an explanatory view showing carrier waves to be modulated with transmission signals according to the second embodiment of the present invention;

FIG. 11 is an explanatory view showing an addition and subtraction calculation corresponding to each carrier wave performed as a demodulation process according to the second embodiment;

FIG. 12 is an explanatory view showing calculation of the amplitude of a modulated signal in each demodulation process according to the second embodiment;

FIG. 18 shows carrier waves modulated with position signals and an input signal in one modulation period; and FIG. 19 is a view showing the correspondence of the carrier waves to the groups of electrode pairs according to the modification of the third embodiment.

DETAILED DESCRIPTION OF THE PREFERRED EMBODIMENTS

Figure 1:
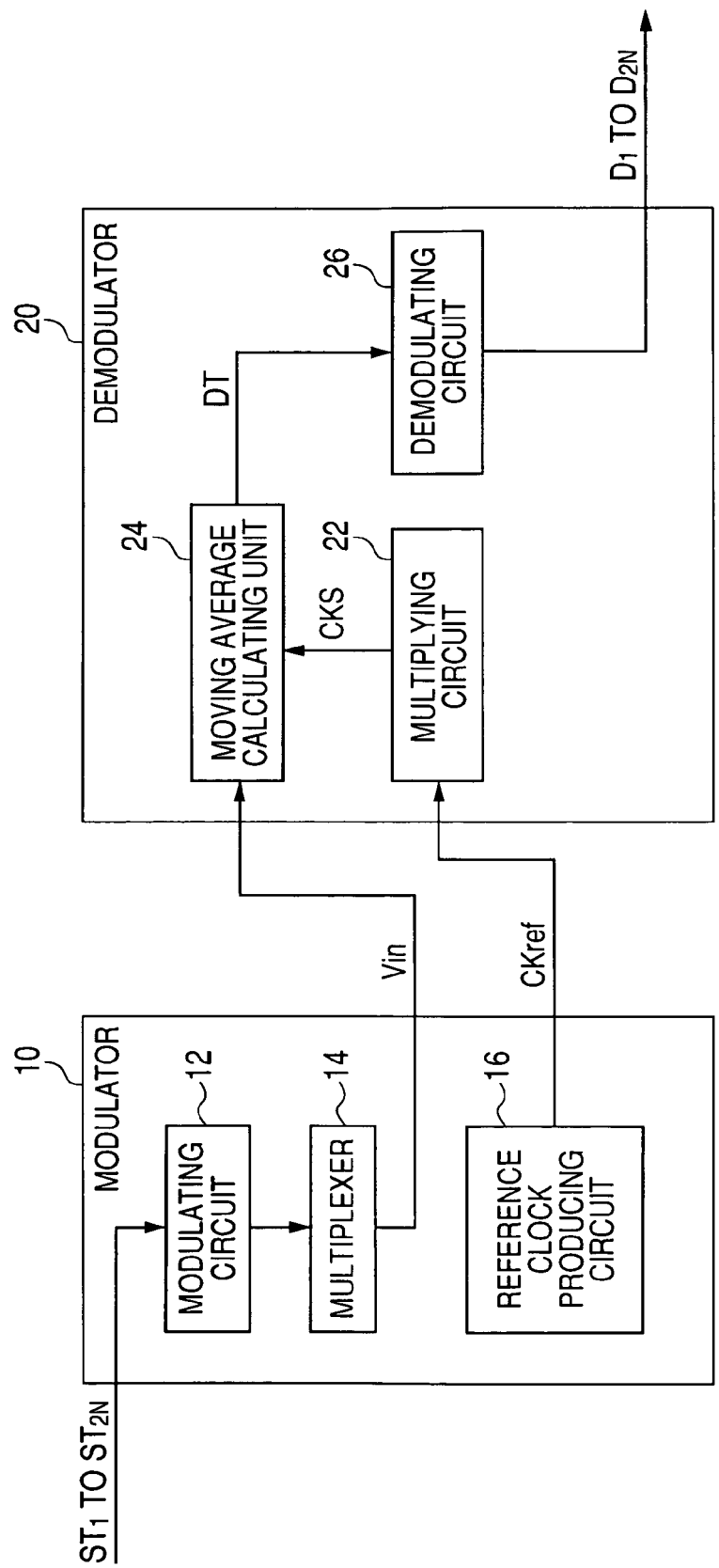
FIG. 1 is a view schematically showing a signal multiplexing and transmitting system in which a signal multiplexing and transmitting method is performed according to the first embodiment of the present invention.

Embodiments of the present invention will now be described with reference to the accompanying drawings, in which like reference numerals indicate like parts, members or elements throughout the specification unless otherwise indicated.

First Embodiment

A method of transmitting a plurality of modulated signals, obtained by modulating a plurality of carrier waves having different frequencies or phases with respective transmission signals having various signal levels and multiplexed to produce an input signal by frequency division multiplexing, to a synchronous detector to reproduce or extract the transmission signals from the input signal in synchronous detection with high precision regardless of the levels of the transmission signals will be described according to the first embodiment.

Figure 2:
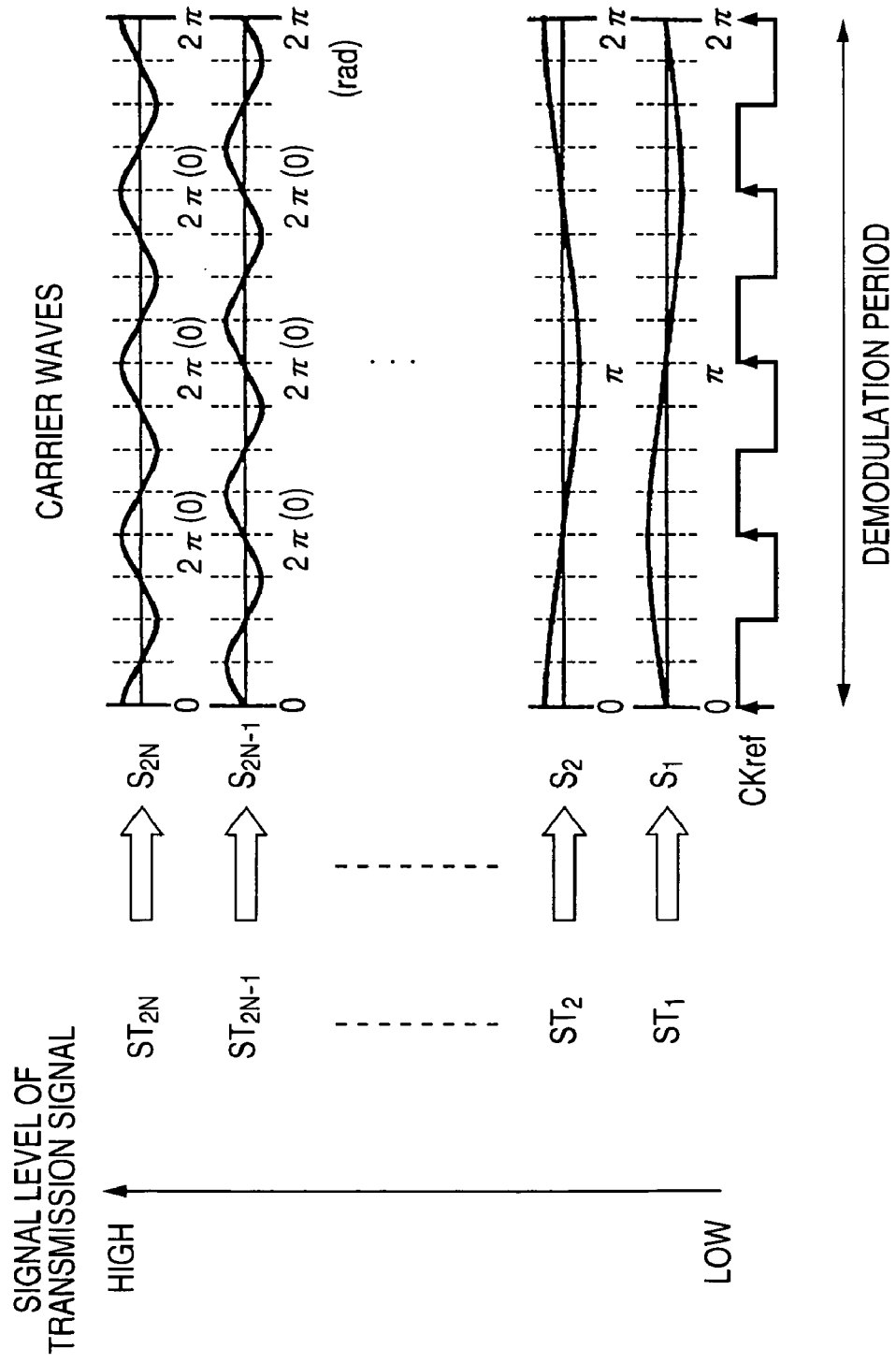
FIG. 2 is an explanatory view showing carrier waves to be modulated with transmission signals in a modulating circuit of the system according to the first embodiment.
Figure 3:
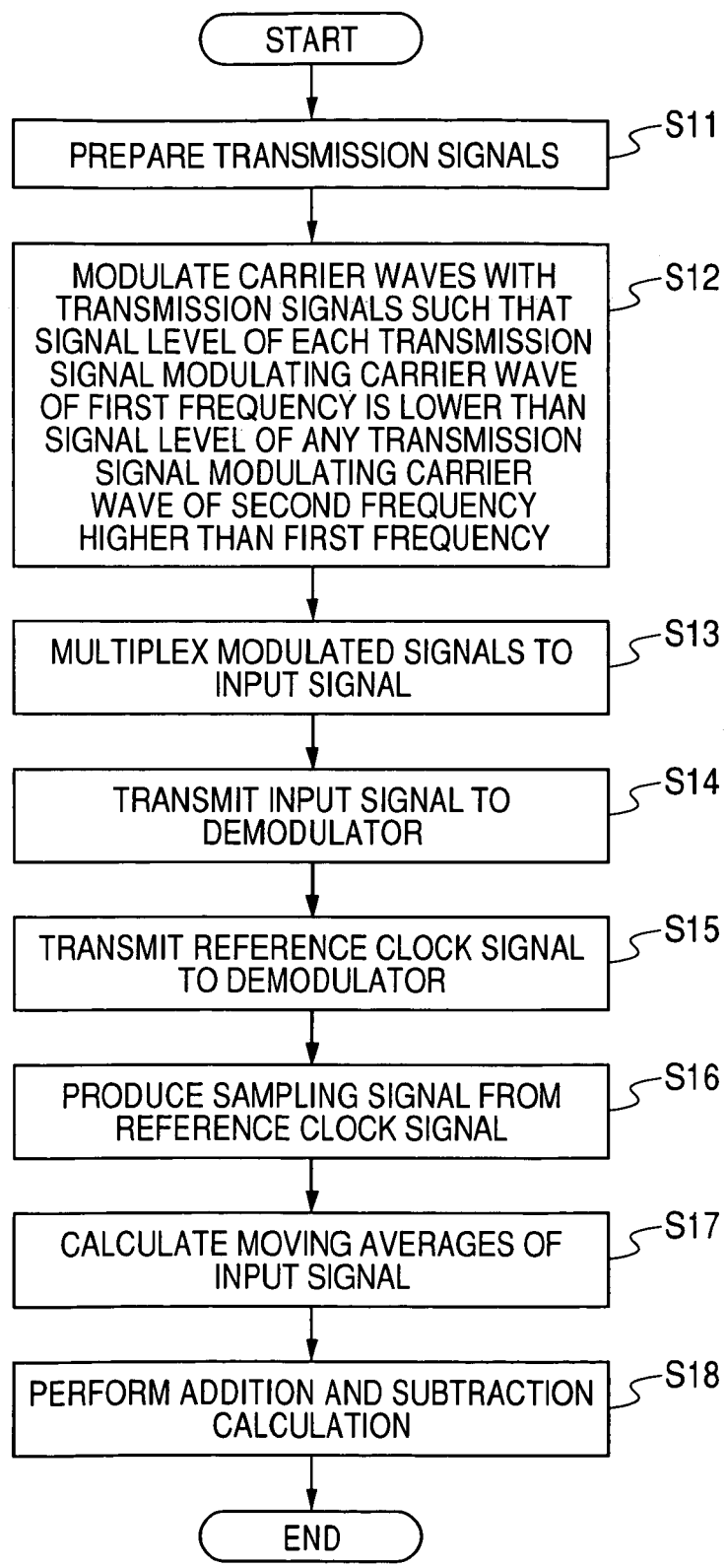
FIG. 3 is a flow chart showing a signal multiplexing and transmitting method according to the first embodiment.

FIG. 1 is a view schematically showing a signal multiplexing and transmitting system in which a signal multiplexing and transmitting method is performed according to the first embodiment, while FIG. 2 is an explanatory view showing the carrier waves to be modulated with transmission signals in a modulating circuit of the system. FIG. 3 is a flow chart showing a signal multiplexing and transmitting method according to the first embodiment.

A plurality of transmission signals $ST_{2i-1}$ and $ST_{2i}$ ($i=1,2,---,N$; N is a positive integer equal to or higher than 2) are prepared (step S11 in FIG. 3).

As shown in FIG. 1 and FIG. 2, a signal multiplexing and transmitting system 1 has a modulator 10 and a demodulator 20. The modulator 10 has a modulating circuit 12. In this circuit 12, a first set of carrier waves $S_{2i-1}$ and a second set of carrier waves $S_{2i}$ are generated, and the carrier waves $S_{2i-1}$ and $S_{2i}$ are modulated with the respective transmission signals $ST_{2i-1}$ and $ST_{2i}$ in amplitude modulation (step S12 in FIG. 3). Therefore, each transmission signal is superimposed onto one carrier wave, and a first set of modulated signals $SM_{2i-1}$ having modulated carrier waves and a second set of modulated signals $SM_{2i}$ having modulated carrier waves are produced.

Each transmission signal has information such as the strength of time-dependent acceleration applied to a vehicle along one of three axes or the level of time-dependent angular velocity such as yaw rate around one axis applied to a vehicle. This information is indicated by the time-dependent amplitude of the signal.

The carrier waves $S_{2i-1}$ and $S_{2i}$ in each pair have the same frequency $f_i = f_{max}/2^{N-i}$ ($f_{max}$ is a reference frequency) but have phases shifted from each other by $\pi/2$ radians (or 90 degrees). For example, the amplitudes of the carrier waves $S_{2i-1}$ and $S_{2i}$ at an arbitrary time t are expressed by wave functions:

$$S_{2i-1}(t) = A \sin 2\pi f_i t \text{ and } S_{2i}(t) = A \sin 2\pi f_i(t+\pi/2),$$

wherein A denotes the maximum amplitude. Therefore, the frequency of the pair of carrier waves $S_{2(i-1)-1}$ and $S_{2(i-1)}$ is a half of the frequency of the pair of carrier waves $S_{2i-1}$ and $S_{2i}$.

Specifically, a signal level (i.e., amplitude or voltage level) of each transmission signal modulating one carrier wave of a first frequency is lower than the signal level of any transmission signal modulating another carrier wave of a second frequency higher than the first frequency. That is, as the signal level of the transmission signal $ST_{2i-1}$ (or $ST_{2i}$) becomes lowered, the frequency of the carrier wave modulated with the transmission signal $ST_{2i-1}$ (or $ST_{2i}$) is lowered. Therefore, amplitudes of the modulated signals $SM_{2i-1}$ and $SM_{2i}$ obtained by modulating the carrier waves $S_{2i-1}$ and $S_{2i}$ with the transmission signals $ST_{2i-1}$ and $ST_{2i}$ become larger than amplitudes of the modulated signals $SM_{2(i-1)-1}$ and $SM_{2(i-1)}$ obtained by modulating the carrier waves $S_{2(i-1)-1}$ and $S_{2(i-1)}$ with the transmission signals $ST_{2(i-1)-1}$ and $ST_{2(i-1)}$. That is, as the frequency of the carrier wave is increased, the amplitude of the modulated signal obtained by modulating the carrier wave becomes large.

The modulator 10 further has a multiplexer 14 and a reference clock producing circuit 16. In the multiplexer 14, the modulated signals $SM_{2i-1}$ and $SM_{2i}$ are multiplexed to produce an input signal Vin by frequency division multiplexing (step S13 in FIG. 3). Then, this signal Vin is transmitted to the demodulator 20 through a transmission line 2 (step S14 in FIG. 3). In the circuit 16, a reference clock signal CKref, which is a series of pulses, is produced. This signal CKref is also transmitted to the demodulator 20 through a clock signal line 4 (step S15 in FIG. 3).

The reference frequency Fc of the signal CKref is equal to the frequency $f_{max}$ of the carrier waves $S_{2N-1}$ and $S_{2N}$ having the highest frequency among the carrier waves $S_{2i-1}$ and $S_{2i}$, and the phase of the signal CKref is synchronized with the phase of the carrier wave $S_{2N}$. That is, at any timing the carrier wave $S_{2N}$ crosses the fluctuation center, the signal CKref is placed at one leading or trailing edge. The phase of the signal CKref may be synchronized with the phase of the carrier wave $S_{2N-1}$.

The demodulator 20 has a multiplying circuit 22, a moving average calculating unit 24 and a demodulating circuit 26. In the circuit 22, the frequency of the signal CKref is multiplied by four to produce a sampling signal CKS having the sampling cycle 1/4Fc which is equal to one-fourth of the cycle 1/Fc of the signal CKref (step S16 in FIG. 3). In the unit 24, the input signal Vin is received in the modulator 10, and a moving average DT of the time-dependent amplitude of the signal Vin in one sampling period of time equal to the sampling cycle 1/4Fc is calculated every sampling period (step S17 in FIG. 3). In the circuit 26, the moving averages DT are successively latched in one demodulation period of time longer than the sampling period, and an addition and subtraction calculation corresponding to the cycle and phase of each carrier wave $S_j$ (j=1,2- - -, or 2N) is performed for the moving averages DT arranged in the latching order as a demodulation process to detect the modulated carrier wave of the modulated signal $SM_j$ in synchronous detection and to obtain 2N synchronous detection results $D_j$ corresponding to the average amplitude of the respective modulated signals $SM_j$ (i.e., amplitude of the respective transmission signals $ST_j$) in the demodulation period (step S18 in FIG. 3). The addition and subtraction calculation corresponding to each carrier wave $S_j$ differs from those corresponding to the other carrier waves $S_k$ (k≠j), and the calculations corresponding to the carrier waves $S_1$ to $S_{2N}$ are performed in parallel to one another.

The demodulation period is, for example, set at the cycle $1/f_1$ ($f_1 = f_{max}/2^{N-1}$) of the carrier wave $S_1$ or $S_2$ having the lowest frequency. Therefore, the addition and subtraction calculation is performed for $2^{N+1}$ moving averages DT successively latched every demodulation period, and the synchronous detection results $D_1$ and $D_{2N}$ for all carrier waves are obtained every demodulation period.

Figure 4:
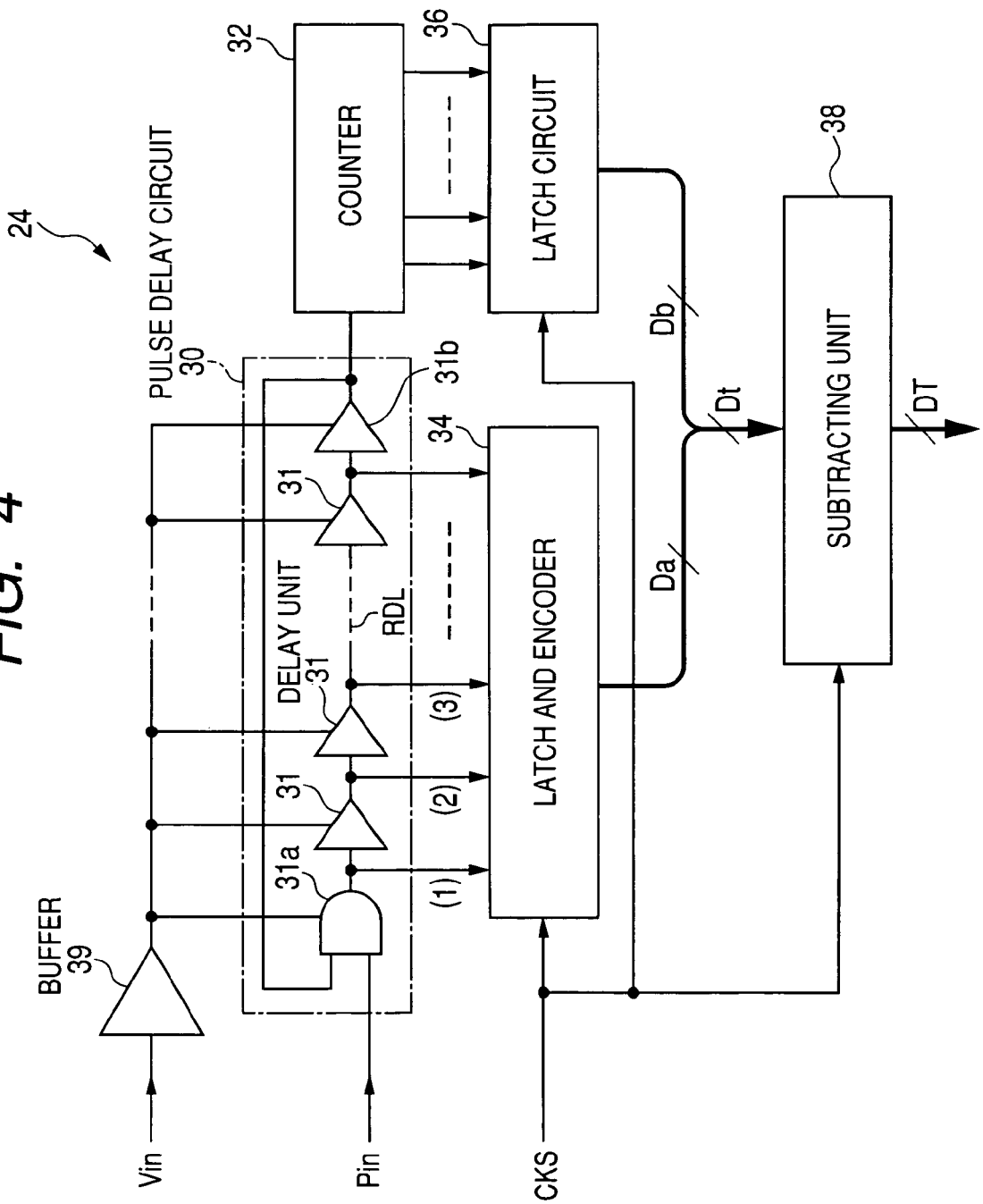
FIG. 4 is a block diagram of a moving average circuit of the system shown in FIG. 1.

The structure and function of the unit 24 are described in detail with reference to FIG. 4. FIG. 4 is a block diagram of the unit 24.

As shown in FIG. 4, a time analog-to-digital (A/D) converter composed of digital circuits is used for the unit 24. The unit 24 has a pulse delay circuit 30 having a plurality of delay units 31 connected in series along a ring delay line RDL to repeatedly circulate a pulse signal Pin, inputted to the top delay unit 31a, through the delay units 31 while delaying the signal Pin by a delay time in each delay unit 31, a buffer 39 through which the time-dependent voltage of the input signal Vin is applied to each delay unit 31 as a driving voltage to set the delay time of the delay unit 31, a counter 32 for counting how many times the pulse signal Pin passes through the final delay unit 31b to detect the number of circulations of the pulse signal Pin repeatedly circulated in the circuit 30, and a latch and encoder 34 for latching the pulse signal Pin at the timing of each leading edge (or each trailing edge) of the sampling signal CKS to detect a reached position of the pulse signal Pin in the delay units 31 every sampling period of time and to produce digital bit data Da of a detection result, indicating the number of delay units 31 existing from the top delay unit 31a to the reached position.

The top delay unit 31a is an AND gate having two input terminals and one output terminal, and each of the other delay units 31 is a gate circuit composed of a series of inverters. The signal Pin is received at one input terminal of the unit 31a, and the other input terminal of the unit 31a is connected with the output terminal of the final delay unit 31b to again receive the signal Pin, circulated through all delay units 31 by one time, in the unit 31a. Therefore, the signal Pin is circulated in the delay units 31 of the circuit 30 every sampling period.

The unit 24 further has a latch circuit 36 for latching a counted value denoting the circulation number from the counter 32 at the timing of each leading edge (or each trailing edge) of the sampling signal CKS and producing digital bit data Db denoting the counted value every sampling period, a subtracting unit 38 for producing digital data Dt having the bit data Da placed at lower bit positions of the data Dt and the bit data Db placed at higher bit positions of the data Dt every sampling period and calculating a difference between the digital data Dt obtained in the present sampling period and the digital data Dt obtained in the previous sampling period just before the present sampling period to obtain digital data DT corresponding to the present sampling period.

Therefore, the combination of the counter 32, the latch and encoder 34, the latch circuit 36 and the subtracting unit 38 counts the number of delay units 31, through which the pulse signal Pin has passed, every sampling period.

The delay time of each delay unit 31 depends on the time-dependent voltage level of the signal Vin. Therefore, the sum of the delay times of the delay units 31, through which the pulse signal Pin has passed in one sampling period, corresponds to the moving average equal to the average of the time-dependent amplitude of the signal Vin in the sampling period. The digital data DT indicates the number of delay units 31 through which the pulse signal Pin has passed in the present sampling period. Therefore, the digital data DT obtained in each sampling period indicates the moving average of the amplitude of the signal Vin in the sampling period.

Accordingly, the moving average of the input signal Vin can reliably be obtained every sampling period in the unit 24.

The addition and subtraction calculation in the circuit 26 will be described with reference to FIG. 5. FIG. 5 is a view showing an addition and subtraction calculation corresponding to each carrier wave.

As shown in FIG. 5, six carrier waves $S_1$ to $S_6$ (N=3) are, for example, modulated with six transmission signals $ST_1$ to $ST_6$, and six modulated signals $SM_1$ to $SM_6$ are multiplexed to an input signal Vin. In this case, sixteen moving averages DT1 to DT16 of the input signal Vin are calculated in the unit 24 every demodulation period $1/f_1$. Each carrier wave expressed by sine wave $\sin 2\pi f_i t$ or $\sin 2\pi f_i(t+\pi/2)$ is placed in the positively oscillating phase range from the fluctuation center in the first phase period from 0 radian (or 0 degree) to $\pi$ radians (or 180 degrees) (i.e., the phase period in which the function $\sin 2\pi f_i t$ or $\sin 2\pi f_i(t+\pi/2)$ is positive), while the carrier wave is placed in the negatively oscillating phase range from the fluctuation center in the second phase period from $\pi$ radians (180 degrees) to $2\pi$ radians (360 degrees) (i.e., the phase period in which the function $\sin 2\pi f_i t$ or $\sin 2\pi f_i(t+\pi/2)$ is negative). In the addition and subtraction calculation corresponding to the cycle and phase of each carrier wave $S_j$, the sum DS1 of the moving averages in the first phase period of the carrier wave $S_j$ and the sum DS2 of the moving averages in the second phase period of the carrier wave $S_j$ are calculated every demodulation period, and the difference between the sums D1 and D2 is calculated as a synchronous detection result $D_j$ of the demodulation process Pj. The calculations corresponding to all carrier waves are performed in parallel to one another.

FIG. 6 is an explanatory view showing one transmission signal reproduced in each demodulation process.

In the calculation of the moving averages in the unit 24, each moving average of the input signal Vin denotes the sum of moving averages of all modulated signals $SM_1$ to $SM_{2N}$ in the corresponding sampling period.

In the addition and subtraction calculation corresponding to the frequency and phase of each carrier wave $S_j$, the difference between the sum of the moving averages of each of the other modulated signals $SM_k$ ($k \neq j$) in the first phase period of the carrier wave $S_j$ and the sum of the moving averages of the modulated signal $SM_k$ in the second phase period of the carrier wave $S_j$ becomes zero. Therefore, as shown in FIG. 6, although each moving average of the input signal Vin is the sum of moving averages of all modulated signals $SM_1$ to $SM_{2N}$, no influence of the modulated signals $SM_k$ is exerted on the synchronous detection result $D_j$, but the result $D_j$ corresponds to the average of the amplitude of the modulated signal $SM_j$. Thus, each synchronous detection result $D_j$ corresponds to the amplitude of the transmission signal $ST_j$ superimposed onto the carrier wave $S_j$. Therefore, signal levels of the transmission signals are detected every demodulation period.

Accordingly, the amplitude of each transmission signal $ST_j$ can reliably be obtained every demodulation period in the circuit 26, so that the wave shape of each transmission signal $ST_j$ can reliably be extracted or reproduced from the input signal Vin in the demodulation periods.

Next, the precision in the synchronous detection will be described.

Because the moving averages of the input signal Vin are calculated in the digital circuits of the moving average calculating unit 24, each moving average of the input signal Vin inevitably has an error. As shown in FIG. 4, each moving average is calculated from the number of delay units 31 through which the pulse signal Pin has passed during one sampling period. Therefore, although the voltage level of the input signal Vin applied to the delay units 31 is continuously changed with respect to time, the moving average is discontinuously changed with the voltage level of the input signal Vin. More specifically, the sum of the delay times corresponding to the calculation of each moving average inevitably has an error which is shorter than one delay time of one delay unit through which the signal Pin has not yet passed. Therefore, each moving average of the input signal Vin is inevitably shortened by an error, and the error of this moving average is added to the moving average calculated in the next sampling period.

Further, as the frequency of the carrier wave is lowered, the first phase period of the carrier wave having a positive value is lengthened, and the second phase period of the carrier wave having a negative value is lengthened. That is, as the frequency of the carrier wave is lowered, the number of moving averages of the input signal Vin added and subtracted in the addition and subtraction calculation in one cycle of the carrier wave is increased.

Therefore, as the frequency of the carrier wave is lowered, errors occurring in the moving averages can effectively be cancelled out every cycle of the carrier wave.

In contrast, as the frequency of the carrier wave is increased, the first phase period of the carrier wave having a positive value is shortened, and the second phase period of the carrier wave having a negative value is shortened. That is, as the frequency of the carrier wave is increased, the number of moving averages of the input signal Vin added and subtracted in the addition and subtraction calculation in one cycle of the carrier wave is decreased.

Therefore, as the frequency of the carrier wave is increased, the cancellation of errors of the moving averages in the cycle of the carrier wave becomes insufficient. Further, the first and second phase periods of the carrier wave are frequently changed. Therefore, an error remaining every first phase period and an error remaining every second phase period are accumulated at the higher level.

Accordingly, as the frequency of the carrier wave is lowered, the precision in the synchronous detection corresponding to the carrier wave modulated with a signal can be heightened.

Further, as the signal level of the transmission signal is heightened, the signal level of the modulated signal corresponding to the transmission signal is heightened so as to increase the signal-to-noise (S/N) ratio of the modulated signal. Accordingly, as the signal level of the transmission signal is heightened, the transmission signal can be reproduced from the input signal Vin at the higher S/N ratio.

In this embodiment, as the signal level of the transmission signal is lowered, the frequency of the carrier wave modulated with the transmission signal is lowered. That is, the frequency of each carrier wave modulated with one transmission signal having a first signal level is set to be equal to or lower than the frequency of any carrier wave modulated with another transmission signal having a second signal level higher than the first signal level. More specifically, among the carrier waves $S_{2i-1}$ or $S_{2i}$ having different frequencies, the frequency of each carrier wave, modulated with one transmission signal having a first signal level, is set to be lower than frequencies of other carrier waves modulated with other transmission signals having signal levels higher than the first signal level. In case of two carrier waves having the same frequency but having different phases, these two carrier waves are modulated with respective transmission signals having different signal levels.

Therefore, as the level of the transmission signal becomes low, the precision in the synchronous detection for extracting the transmission signal is heightened.

Accordingly, because the transmission signal having the low level modulates the carrier wave having a low frequency so as to detect the modulated carrier wave in the synchronous detection with the high precision, the transmission signal having the low level can be reproduced in the demodulation with the sufficiently high precision.

Further, because the transmission signal modulating the carrier wave having a high frequency has a high signal level, the transmission signal having the high level can be appropriately reproduced from the input signal at a sufficiently high S/N ratio even in the synchronous detection performed with low precision.

As described above, in this method, the frequency of each carrier wave modulated with one transmission signal having a first signal level is set to be equal to or lower than the frequency of any carrier wave modulated with another transmission signal having a second signal level higher than the first signal level. Therefore, even when a part of transmission signals have low signal levels, the transmission signals are superimposed onto respective carrier waves having low frequencies, and the transmission signals are extracted in the synchronous detection with high precision. Further, even when carrier waves having high frequencies are modulated with the remaining part of transmission signals having high signal levels so as to lower the precision in the synchronous detection, the transmission signals having high signal levels are extracted in the synchronous detection at a sufficiently high S/N ratio.

Accordingly, the transmission signals superimposed onto the carrier waves can be appropriately reproduced from the input signal Vin in the demodulation with high precision or at a sufficiently high S/N ratio regardless of the signal levels of the transmission signals, and high transmission quality of the transmission signals can be obtained.

In this embodiment, the frequency of each carrier wave $S_{2(i-1)-1}$ (or $S_{2(i-1)}$) is a half of the frequency of the carrier wave $S_{2i-1}$ (or $S_{2i}$). However, the frequency of at least one carrier wave $S_{2(i-1)-1}$ (or $S_{2(i-1)}$) may be $1/2^m$ (m is a positive integer equal to or higher than 2) of the frequency of the carrier wave $S_{2i-1}$ (or $S_{2i}$).

Further, in this embodiment, the transmission signals have different signal levels. However, some of the transmission signals may have the same signal level. In this case, frequencies of carrier waves modulated with respective transmission signals commonly having a first signal level are set to be lower than the frequency of any carrier wave modulated with another transmission signal having a second signal level higher than the first signal level and are set to be higher than the frequency of any carrier wave modulated with another transmission signal having a third signal level lower than the first signal level.

Modification of First Embodiment

In the first embodiment, the modulator 10 generates the first set of carrier waves $S_{2i-1}$ and the second set of carrier waves $S_{2i}$ having the same frequency $f_i=Fc/2^{N-i}$ but having phases different from each other by $\pi/2$ radians to modulate the carrier waves $S_{2i-1}$ and $S_{2i}$ with respective transmission signals $ST_{2i-1}$ and $ST_{2i}$ and to transmit the modulated signals $SM_{2i-1}$ and $SM_{2i}$ to the demodulator 20. However, the modulator 10 may generate only the first set of carrier waves $S_{2i-1}$ to modulate the carrier waves $S_{2i-1}$ with respective transmission signals $ST_{2i-1}$ and to transmit the modulated signals $SM_{2i-1}$ to the demodulator 20.

FIG. 7 is an explanatory view showing carrier waves to be modulated with transmission signals according to modification of the first embodiment.

As shown in FIG. 7, the modulator 10 generates six carrier waves $S_{2i-1}$ (i=1,2, - - - ,N; N=6) having different frequencies $f_i=2^{i-6} \times f_{max}$, modulates the carrier waves $S_{2i-1}$ with respective transmission signals $ST_{2i-1}$, transmits a input signal Vin, obtained by multiplexing the modulated waves $SM_{2i-1}$ by frequency division multiplexing, to the demodulator 20, and outputs a reference clock signal CKref, synchronized with the carrier wave $S_{11}$ having the maximum frequency $f_{max}$, to the demodulator 20.

As the signal level of the transmission signal $ST_{2i-1}$ is heightened, the frequency of the carrier wave $S_{2i-1}$ modulated with the transmission signal $ST_{2i-1}$ is increased. That is, the level of each transmission signal modulating one carrier wave of a first frequency is lower than the level of any transmission signal modulating another carrier wave of a second frequency higher than the first frequency.

The demodulator 20 multiplies the frequency Fc of the signal CKref by two to produce a sampling signal CKS having the sampling cycle 1/2Fc which is equal to one-half of the cycle 1/Fc of the signal CKref, calculates a moving average DT of the time-dependent amplitude of the signal Vin every sampling period of time equal to the sampling cycle 1/2Fc, performs an addition and subtraction calculation corresponding to the cycle and phase of each of the carrier waves $S_{2i-1}$ for the moving averages DT every demodulation period, equal to the cycle $1/f_1$ ($f_1=1/2^5 \times f_{max}$) of the carrier wave $S_1$ having the lowest frequency $f_1$, as a demodulation process $P_{2i-1}$ to detect the modulated carrier wave of the modulated signal $SM_{2i-1}$ in synchronous detection and to obtain a synchronous detection result $D_{2i-1}$ corresponding to the signal level of the transmission signal $ST_{2i-1}$.

FIG. 8 is an explanatory view showing an addition and subtraction calculation corresponding to each carrier wave performed as a demodulation process according to the modification of the first embodiment, while FIG. 9 is an explanatory view showing one transmission signal reproduced in each demodulation process.

As shown in FIG. 8, a group of moving averages DT1 to DT64 of the input signal Vin is calculated in the unit 24 every demodulation period $1/f_1$. In the demodulation process $P_{2i-1}$ of the circuit 26 for each modulated signal $SM_{2i-1}$, the moving averages calculated in the first phase period of the carrier wave $S_{2i-1}$ having a positive value are added to one another to obtain a summed value, and the moving averages in the second phase period of the carrier wave $S_{2i-1}$ having a negative value are subtracted from the summed value to obtain a synchronous detection result $D_{2i-1}$.

Therefore, as shown in FIG. 9, an addition and subtraction result for the moving averages of each of the modulated signals $SM_k$ ($k \neq 2i-1$) included in the input signal Vin becomes zero, and the synchronous detection result $D_{2i-1}$ corresponding to only the modulated signal $SM_{2i-1}$ is obtained. Because the amplitude of the modulated signal $SM_{2i-1}$ indicates the amplitude of the transmission signal $SM_{2i-1}$, the result $D_{2i-1}$ indicates the amplitude of the transmission signal $SM_{2i-1}$ in each modulation period.

Accordingly, because the level of each transmission signal $ST_{2i-1}$ modulating one carrier wave $S_{2i-1}$ of a first frequency is lower than the level of any transmission signal $ST_{2(i+1)-1}$ modulating another carrier wave $S_{2(i+1)-1}$ of a second frequency higher than the first frequency, the transmission signals superimposed onto the carrier waves can be appropriately extracted from the input signal Vin in the demodulation with the sufficiently high demodulation precision, and a high transmission quality of the transmission signals can be obtained.

Second Embodiment

In the first embodiment, the reference clock signal CKref, of which the phase is synchronized with the phase of one carrier wave having the highest frequency, is transmitted to the demodulator 20 to produce the sampling signal CKS from the signal CKref and to calculate one moving average every sampling period indicated by the sampling signal CKS. In this case, the sampling signal CKS is substantially placed at its leading edge at each timing the carrier wave crosses its fluctuation center. Therefore, in the addition and subtraction calculation corresponding to each carrier wave, the difference between the sum of the moving averages in the first phase period of the carrier wave and the sum of the moving averages in the second phase period of the carrier wave is calculated as a synchronous detection result.

However, in the second embodiment, no reference clock signal CKref is transmitted to the demodulator 20. Therefore, the phase of the sampling signal CKS produced in the demodulator 20 is not synchronized with the phase of any carrier wave. The demodulator 20 performs the quadrature detection of the input signal Vin to reproduce the transmission signal superimposed in each carrier wave in the demodulation.

More specifically, the modulator 10 generates carrier waves $S_{2n-1}$ (n=1,2, - - -, N+1), modulates the carrier waves with respective transmission signals $ST_{2n-1}$, and multiplexes modulated signals $SM_{2n-1}$ to an input signal Vin.

The amplitudes of the carrier waves $S_{2n-1}$ at an arbitrary time t are expressed by wave functions; $S_{2n-1}(t)=A \sin(2\pi f_n t + p)$, wherein $f_n = f_{max}/2^{N-n+1}$ is satisfied and p denotes the phase of the carrier waves at the time t=0.

As the signal level of the transmission signal is lowered, the frequency of the carrier wave modulated with the transmission signal is lowered. That is, the frequency of each carrier wave $S_{2n-1}$ modulated with one transmission signal $ST_{2n-1}$ having a first signal level is set to be equal to or lower than the frequency of any carrier wave $S_{2(n+1)-1}$ modulated with another transmission signal $ST_{2(n+1)-1}$ having a second signal level higher than the first signal level.

FIG. 10 is an explanatory view showing carrier waves to be modulated with transmission signals according to the second embodiment. As shown in FIG. 10, in case of N=5, the modulator 10 generates the carrier waves $S_1$, $S_3$, - - -, $S_{11}$.

The demodulator 20 receives the signal Vin from the modulator 10 and produces a sampling signal CKS having a series of pulses. The cycle Ts of the signal CKS is equal to one-fourth of the cycle $1/f_{max}$ of the carrier waves $S_{N+1}$ having the highest frequency among the carrier waves. The moving average calculating unit 24 calculates one moving average $DT_j$ (j=1,2, - - -, or $2^{N+2}$) of the time-dependent amplitude of the signal Vin every sampling period Ts in synchronization with the signal CKS.

$$DT_j = \int_{(j-1)Ts}^{jTs} S(t)dt$$

$$j = 1, 2, --, 2^{N+2}$$

The wave function S(t) of the signal Vt is expressed by $S_1(t)+S_3(t)+ - - - +S_{N+1}(t)$. Each moving average $DT_j$ is equal to the sum of moving averages $DT_{j,2n-1}$ of time-dependent amplitudes of the modulated carrier waves in the modulated signals $SM_{2n-1}$.

The demodulating circuit 26 performs the addition and subtraction calculation corresponding to the cycle of each carrier wave $S_{2n-1}$ for the moving averages $DT_j$ every modulation period $1/f_1$ as a demodulation process $DP_{2n-1}$ to obtain a first moving average difference $I_{2n-1}$ and a second moving average difference $Q_{2n-1}$ in the quadrature detection of each modulated carrier wave corresponding to the carrier wave $S_{2n-1}$.

$$I_{2n-1} = \sum_{i=1}^{2^{n-1}} \left\{ \sum_{k=2^{N-n+1}(4i-4)+1}^{2^{N-n+1}(4i-3)} DT_k + \sum_{k=2^{N-n+1}(4i-3)+1}^{2^{N-n+1}(4i-2)} DT_k - \sum_{k=2^{N-n+1}(4i-2)+1}^{2^{N-n+1}(4i-1)} DT_k - \sum_{k=2^{N-n+1}(4i-1)+1}^{2^{N-n+1}4i} DT_k \right\}$$

$$Q_{2n-1} = \sum_{i=1}^{2^{n-1}} \left\{ \sum_{k=2^{N-n+1}(4i-4)+1}^{2^{N-n+1}(4i-3)} DT_k - \sum_{k=2^{N-n+1}(4i-3)+1}^{2^{N-n+1}(4i-2)} DT_k - \sum_{k=2^{N-n+1}(4i-2)+1}^{2^{N-n+1}(4i-1)} DT_k + \sum_{k=2^{N-n+1}(4i-1)+1}^{2^{N-n+1}4i} DT_k \right\}$$

FIG. 11 is an explanatory view showing an addition and subtraction calculation corresponding to each carrier wave performed as a demodulation process according to the second embodiment. As shown in FIG. 11, in case of N=5, the demodulator 20 calculates the first moving average differences $I_1$, $I_3$, - - -, $I_{11}$ and the second moving average differences $Q_1$, $Q_3$, - - -, $Q_{11}$ from the moving averages $DT_1$ to $DT_{128}$ every modulation period $1/f_1$.

The influence of the moving averages $DT_{j,2m-1}$ (m ≠ n) on the differences $I_{2n-1}$ and $Q_{2n-1}$ disappears in this calculation. The differences $I_{2n-1}$ and $Q_{2n-1}$ are expressed as follows.

$$I_{2n-1} = 2^n \times A_n/(\pi f_n) \times \cos P_n$$

$$Q_{2n-1} = 2^n \times A_n/(\pi f_n) \times \sin P_n$$

The symbol $A_n$ denotes the average amplitude of the modulated signal $SM_{2n-1}$ in each modulation period $1/f_1$, and the symbol $P_n$ denotes the average phase of the modulated signal $SM_{2n-1}$ in each modulation period $1/f_1$. The amplitude $A_n$ is expressed as follows.

$$A_n = (\pi f_n)/2^n \times (I_{2n-1}^2 + Q_{2n-1}^2)^{1/2}$$

FIG. 12 is an explanatory view showing the calculation of the amplitude of the modulated signal in each demodulation process. As shown in FIG. 12, in case of N=5, the demodulator 20 calculates amplitudes $A_1$, $A_3$, - - -, $A_{11}$ of the modulated signals $SM_1$, $SM_2$, - - -, $SM_{11}$.

The demodulating circuit 26 outputs each amplitude $A_n$ as a synchronous detection result $D_n$. The second power of the amplitude $A_n$ corresponds to the voltage level. Therefore, this result $D_n$ corresponds to the amplitude (or voltage level) of the transmission signal $ST_{2n-1}$ superimposed onto the carrier wave $S_{2n-1}$ in each demodulation period.

Therefore, even when no reference clock signal is transmitted from the modulator 10 to the demodulator 20, each transmission signal can be extracted in the demodulation from the amplitude of the corresponding modulated signal detected every demodulation period.

Accordingly, because the frequency of each carrier wave $S_{2n-1}$ modulated with one transmission signal $ST_{2n-1}$ having a first signal level is set to be equal to or lower than the frequency of any carrier wave $S_{2(n+1)-1}$ modulated with another transmission signal $ST_{2(n+1)-1}$ having a second signal level higher than the first signal level, the transmission signals superimposed onto the carrier waves can be appropriately extracted from the input signal Vin in the demodulation with the sufficiently high demodulation precision, and a high transmission quality of the transmission signals can be obtained.

The calculation of the amplitudes of the modulated signals is described in detail in Published Japanese Patent First Publication No. 2005-102129.

Third Embodiment

A physical quantity detector for detecting a physical quantity by using the method according to the first or second embodiment will be described. In this embodiment, this detector is, for example, disposed on a vehicle to detect the strength of acceleration applied to the vehicle in the x-axial direction (or first direction), the strength of acceleration applied to the vehicle in the z-axial direction (or second direction), the strength of acceleration applied to the vehicle along the y-axial direction (or third direction), the level of angular velocity such as yaw rate applied to the vehicle around an x-axis, and the level of angular velocity applied to the vehicle around a y-axis.

Figure 13:
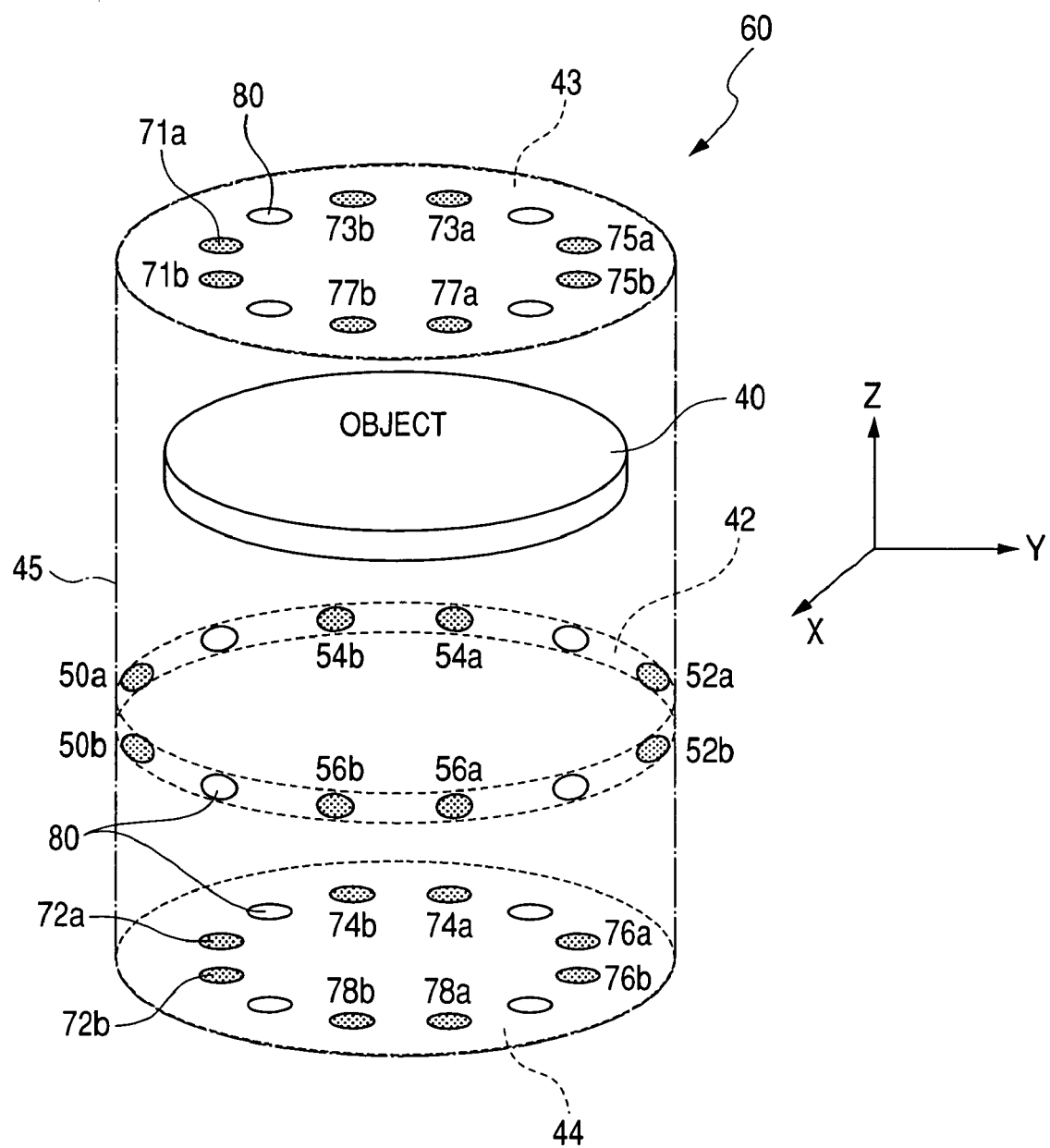
FIG. 13 is a perspective side view of a sensor disposed in a physical quantity detector according to the third embodiment of the present invention.

FIG. 13 is a perspective side view of a sensor of a physical quantity detector according to the third embodiment.

As shown in FIG. 13, a sensor 50 has a case 45 with a cylindrical side wall 42, a top cover 43 closing the top opening of the wall 42 and a bottom cover 44 closing the bottom opening of the wall 42 to form a vacuum therein. The case 45 is made of an insulating material such as glass or the like.

The sensor 50 further has a disc-shaped floating object 40 electrostatically floating in the vacuum within the case 45 to be symmetric with respect to a z-axis extending along the center axis of the case 45. The floating object 40 is made of a conductive material such as silicon or the like.

The sensor 50 further has four surrounding electrode pairs (or first force inducing member) 50, 52, 54 and 56 disposed on the side wall 42 in the same x-y plane perpendicular to the z-axis in symmetric with respect to the z-axis so as to surround the object 40 placed at a predetermined position, four upper electrode pairs (or second force inducing member) 71, 73, 75 and 77 disposed on the top cover 43 in symmetric with respect to the z-axis, and four lower electrode pairs (or second force inducing member) 72, 74, 76 and 78 disposed on the bottom cover 44 in symmetric with respect to the z-axis.

The electrode pairs 71 and 72 forming a z-axial group face each other with the object 40 between then along the z-axis. The electrode pairs 73 and 74 forming another z-axial group face each other with the object 40 between them along the z-axis. The electrode pairs 75 and 76 forming another z-axial group face each other with the object 40 between them along the z-axis. The electrode pairs 77 and 78 forming another z-axial group face each other with the object 40 between them along the z-axis. The electrode pairs 50 and 52 forming a y-axial group face each other with the object 40 between them along the y-axis. The electrode pairs 54 and 56 forming an x-axial group face each other with the object 40 between them along x-axis.

Each of the electrode pairs 50, 52, 54, 56, 71, 72, 73, 74, 75, 76, 77 and 78 is formed of two adjacent electrodes 50a and 50b, 52a and 52b, 54a and 54b, 56a and 56b, 71a and 71b, 72a and 72b, 73a and 73b, 74a and 74b, 75a and 75b, 76a and 76b, 77a and 77b, or 78a and 78b respectively.

The sensor 50 further has twelve common electrodes 80 electrically connected with one another. Four of the electrodes 80 are disposed on the side wall 42 to be alternately arranged with the electrode pairs 50, 52, 54 and 56 on the circular line. Four of the electrodes 80 are disposed on the cover 43 to be alternately arranged with the electrode pairs 71, 73, 75 and 77 on the circular line. The other four electrodes 80 are disposed on the cover 44 to be alternately arranged with the electrode pairs 72, 74, 76 and 78 on the circular line.

When the case 45 is subjected to acceleration and angular velocity, the object 40 is moved relative to the case 45 at a time-dependent speed to change the position along the x-axis, the position along the y-axis and the position along the z-axis in the case 45.

Figure 14:
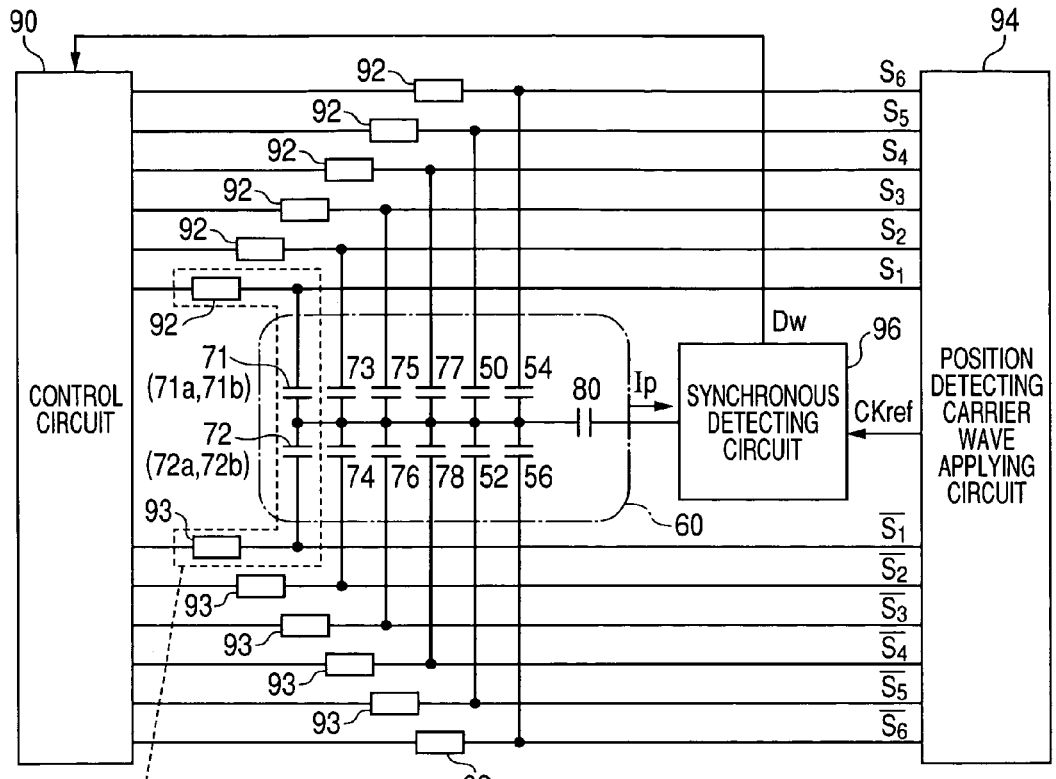
FIG. 14 is a block diagram of the physical quantity detector according to the third embodiment.

FIG. 14 is a block diagram of a physical quantity detector having the sensor 50.

As shown in FIG. 14, a physical quantity detector 100 has six pairs of voltage applying circuits (or voltage signal supplying unit) 92 and 93 for applying control voltage to each of the groups of electrode pairs as a voltage signal.

Each of the electrodes of the electrode pairs receives a voltage signal from the circuit 92 or 93. In response to this voltage signal, the control voltage set at a negative value is applied to one electrode of each electrode pair, and the control voltage set at a positive value is applied to the other electrode of the electrode pair. The absolute voltage values at the electrodes of each electrode pair are the same.

Figure 15:
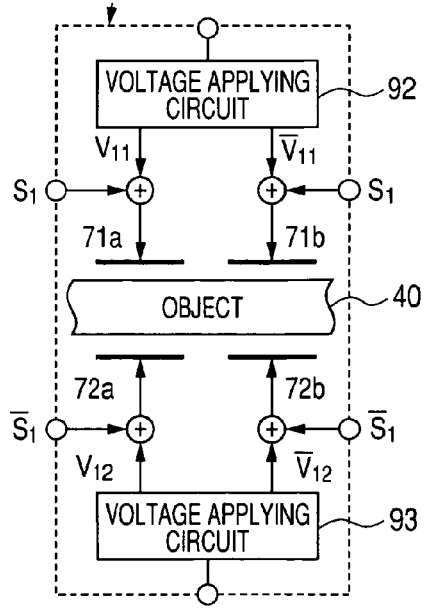
FIG. 15 is a view showing application of a voltage signal and carrier waves to a group of electrode pairs according to the third embodiment.

FIG. 15 is a view showing the application of a voltage signal to the group of electrode pairs 71 and 72.

As shown in FIG. 15, a pair of circuits 92 and 93 applies control voltages V11 and −V11 of a voltage signal to the electrodes 71a and 71b and applies control voltages V12 and −V12 of the voltage signal to the electrodes 72a and 72b. In response to this voltage signal, electrostatic force induced by the z-axial group of electrode pairs 71 and 72 is applied to the object 40 in the z-axial direction. Therefore, the object 40 is placed at a position relative to the group of electrode pairs 71 and 72 in the z-axial direction.

In the same manner, pairs of circuits 92 and 93, respectively, apply control voltages of voltage signals to the group of electrode pairs 73 and 74, the group of electrode pairs 75 and 76, and the group of electrode pairs 77 and 78, and electrostatic force induced by each group of electrode pairs is applied to the object 40 in the z-axial direction. Therefore, the object 40 is placed at a position relative to the group of electrode pairs 73 and 74, a position relative to the group of electrode pairs 75 and 76, and a position relative to the group of electrode pairs 77 and 78.

Further, another pair of circuits 92 and 93 applies control voltage of a control signal to the group of electrode pairs 50 and 52, and electrostatic force induced by the group of electrode pairs 50 and 52 is applied to the object 40 in the y-axial direction. Therefore, the object 40 is place data position relative to the group of electrode pairs 50 and 52 in the y-axial direction.

Moreover, another pair of circuits 92 and 93 applies control voltage of a control signal to the group of electrode pairs 54 and 56, and electrostatic force induced by the group of electrode pairs 54 and 56 is applied to the object 40 in the x-axial direction. Therefore, the object 40 is place data position relative to the group of electrode pair 54 and 56 in the x-axial direction.

Therefore, the object 40 floats in the vacuumed space of the case 45 in response to these electrostatic forces.

The object 40 has an electrostatic potential (or voltage) due to the electrostatic force applied from each of the groups of electrode pairs 71 and 72, 73 and 74, 75 and 76, 77 and 78, 50 and 52, and 54 and 56. The voltage level of the object 40 is changed with the position of the object 40 in the case 45. More specifically, the voltage level of the object 40 depends on the position of the object 40 relative to each group of electrode pairs. Therefore, a position signal SP is substantially produced in the object 40 in response to the voltage signal applied to each pair of circuits 92 and 93, and the position signal has a voltage level indicating the position of the object 40 relative to the group of electrode pairs corresponding to the pair of circuits 92 and 93.

Further, the group of common electrodes 80 electrically connected with one another has a voltage level depending on the voltage levels of the object 40.

The detector 100 further has a position detecting carrier wave applying circuit (or carrier wave applying unit) 94 for applying a plurality of carrier waves $S_{2i-1}$ and $S_{2i}$ (i=1,2, - - - ,N; N is a positive integer equal to or higher than 2) having different frequencies to the groups of electrode pairs. In this embodiment, N=3 is set.

When the circuit 94 applies a plurality of carrier waves having different frequencies to the respective groups of electrode pairs, each carrier wave is also applied to the object 40 due to capacity coupling of the object 40 with the corresponding group of electrode pairs. In the object 40, the amplitude of the carrier wave applied through each group of electrode pairs is changed with the voltage level of the object 40 depending on the position of the object 40 relative to the group of electrode pairs. In other words, the carrier wave $S_{2i-1}$ or $S_{2i}$ applied through each group of electrode pairs is modulated with the position signal $SP_{2i-1}$ or $SP_{2i}$ corresponding to the group of electrode pairs, a plurality of modulated signals $SM_{2i-1}$ and $SM_{2i}$ having modulated carrier waves are produced, and the modulated signals are substantially multiplexed by frequency division multiplexing in the object 40 to produce an input signal Vin.

Figure 16:
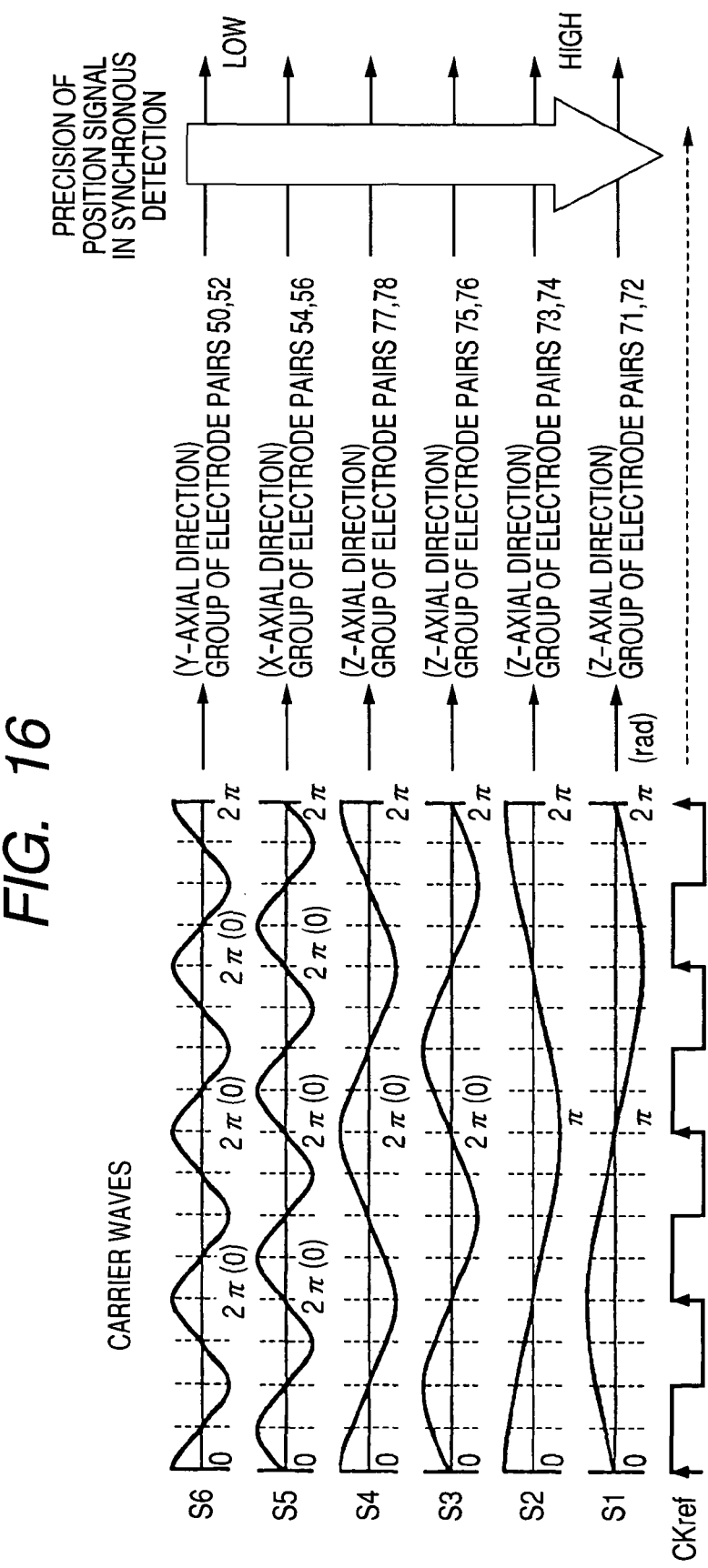
FIG. 16 is a view showing carrier waves applied to respective groups of electrode pairs according to the third embodiment.

FIG. 16 is a view showing carrier waves applied to the respective groups of electrode pairs.

The circuit 94 applies six position detecting carrier waves $S_1$, $S_2$, $S_3$, $S_4$, $S_5$ and $S_6$ shown in FIG. 16 to the respective electrode pairs 71, 73, 75, 77, 50 and 54. The circuit 94 applies six inverted carrier waves $\overline{S}_1$, $\overline{S}_2$, $\overline{S}_3$, $\overline{S}_4$, $\overline{S}_5$ and $\overline{S}_6$ to the respective electrode pairs 72, 74, 76, 78, 52 and 56. Each inverted carrier wave $\overline{S}_{2i-1}$ has the same frequency as that of the carrier wave $S_{2i-1}$ but has the phase shifted from the phase of the carrier wave $S_{2i-1}$ by $\pi$ radians (or 180 degrees). Each inverted carrier wave $\overline{S}_{2i}$ has the same frequency as that of the carrier wave $S_{2i}$ but has the phase shifted from the phase of the carrier wave $S_{2i}$ by $\pi$ radians (or 180 degrees).

The carrier waves $S_{2i-1}$ and $S_{2i}$ at an arbitrary time t are expressed by wave functions:

$$S_{2i-1}(t)=A \sin 2\pi f_i t \text{ and } S_{2i}(t)=A \sin 2\pi f_i(t+\pi/2).$$

Therefore, the carrier waves $S_{2i-1}$ and $S_{2i}$ in each pair have the same frequency $f_i=f_{max}/2^{3-i}$ ($f_{max}$ is a reference frequency) but have phases shifted from each other by $\pi/2$ radians (or 90 degrees).

More specifically, the circuit 94 applies the carrier wave $S_1$ and its converted carrier wave having the lowest frequency to the electrode pairs 71 and 72, and applies the carrier wave $S_2$ and its converted carrier wave having the lowest frequency to the electrode pairs 73 and 74. Therefore, as shown in FIG. 16, the object 40 substantially has a voltage level oscillated with the carrier wave $S_1$ by the electrode pairs 71 and 72 and substantially has a voltage level oscillated with the carrier wave $S_2$ by the electrode pairs 73 and 74.

The circuit 94 applies the carrier wave $S_3$ and its converted carrier wave having the frequency higher than that of the carrier wave $S_1$ to the electrode pairs 75 and 76, and applies the carrier wave $S_4$ and its converted carrier wave having the frequency higher than that of the carrier wave $S_2$ to the electrode pairs 77 and 78. Therefore, as shown in FIG. 16, the object 40 substantially has a voltage level oscillated with the carrier wave $S_3$ by the electrode pairs 75 and 76 and substantially has a voltage level oscillated with the carrier wave $S_4$ by the electrode pairs 77 and 78.

The circuit 94 applies the carrier wave $S_5$ and its converted carrier wave having the highest frequency to the electrode pairs 54 and 56, and applies the carrier wave $S_6$ and its converted carrier wave having the highest frequency to the electrode pairs 50 and 52. Therefore, as shown in FIG. 16, the object 40 substantially has a voltage level oscillated with the carrier wave $S_5$ by the electrode pairs 54 and 56 and substantially has a voltage level oscillated with the carrier wave $S_6$ by the electrode pairs 50 and 52.

Therefore, the carrier waves $S_{2i-1}$ and $S_{2i}$ are modulated with the respective position signals $SP_{2i-1}$ and $SP_{2i}$ in the object 40 to produce six modulated signals $SM_{2i-1}$ and $SM_{2i}$. The amplitude of the modulated carrier wave in each modulated signal is changed with the movement of the object 40 caused by acceleration and angular velocity applied to the case 45. The voltage level of the object 40 is indicated by an input signal Vin which is defined by multiplexing the modulated signals.

In response to the voltage applied to the object 40, an electric field is induced by the object 40, and a voltage based on this electric field is applied to the common electrodes 80 electrically connected with one another. Because the voltage of the object 40 is changed dependent on the positions of the object 40, the common electrodes 80 have a time-dependent voltage corresponding to the position of the object 40.

The detector 100 further has a synchronous detecting circuit (or synchronous detecting unit) 96 for receiving a current signal Ip, indicating the voltage of the object 40, from the common electrodes 80, obtaining the input signal Vin from the current signal Ip to substantially receive the input signal Vin transmitted from the object 40 through the common electrodes 80, and detecting each modulated carrier wave of the input signal Vin in the synchronous detection to extract the position signal $SP_{2i-1}$ or $SP_{2i}$ from the input signal Vin.

The circuit 96 receives an electric current, corresponding to the voltage of the common electrodes 80, from the common electrodes 80 as the current signal Ip. This signal Ip indicates the position of the object 40 relative to the group of electrode pairs 71 and 72, the position of the object 40 relative to the group of electrode pairs 73 and 74, the position of the object 40 relative to the group of electrode pairs 75 and 76, the position of the object 40 relative to the group of electrode pairs 77 and 78, the position of the object 40 relative to the group of electrode pairs 50 and 52, and the position of the object 40 relative to of the group of electrode pairs 54 and 56.

Figure 17:
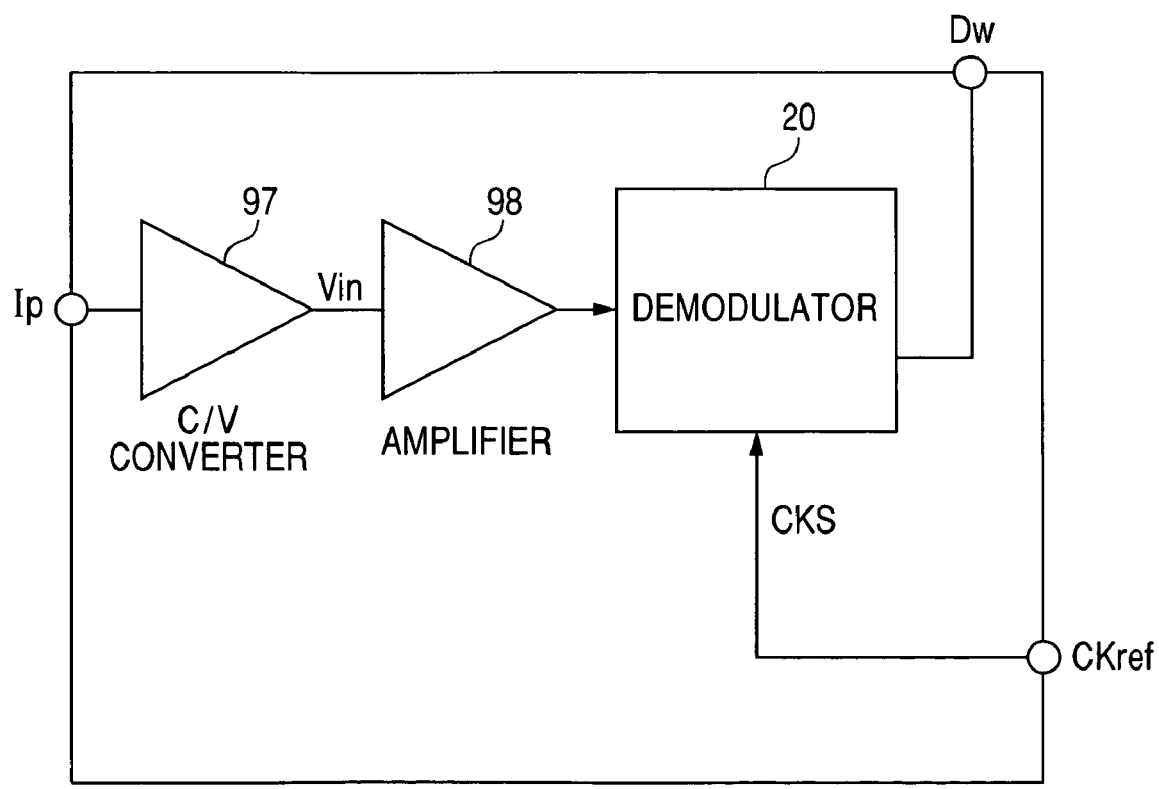
FIG. 17 is a block diagram of a synchronous detecting circuit of the detector.

FIG. 17 is a block diagram of the synchronous detecting circuit 96 of the detector 100, and FIG. 18 shows carrier waves modulated with position signals and input signal Vin in one modulation period.

As shown in FIG. 17, the circuit 96 has a current-to-voltage (C/V) converter 97 for converting the current signal Ip, indicated by current level, to the input signal Vin indicated by voltage level, an amplifier 98 for amplifying the input signal Vin, and the demodulator 20 for performing the demodulation for the amplified input signal Vin to reproduce the position signals $SP_{2i-1}$ and $SP_{2i}$ from the modulated signals.

As shown in FIG. 18, the input signal Vin has six modulated signals $SM_{2i-1}$ and $SM_{2i}$, and each modulated signal has one carrier wave modulated with one position signal $SP_{2i-1}$ or $SP_{2i}$.

As shown in FIG. 14, the detector 100 further has a control circuit (or control unit) 90 for detecting the strength of acceleration applied to the case 45 in the x-axial direction, the strength of acceleration applied to the case 45 in the y-axial direction, the strength of acceleration applied to the case 45 in the z-axial direction, the level of angular velocity applied to the case 45 around the x-axis and the level of angular velocity applied to the case 45 around the y-axis from the position signals extracted in the circuit 96, outputting the detected acceleration and angular velocity, and controlling the circuits 92 and 93 to adjust the voltage signals applied to the groups of electrode pairs according to the position signals and to hold or return the object 40 to/at a predetermined position in the case 45 against acceleration and angular velocity applied to the case 45.

To return the object 40, shifted by acceleration and/or angular velocity, to a predetermined position in the case 45 in response to the position signals, the circuit 90 controls the circuits 71 and 72 to apply voltage signals to the groups of electrode pairs.

However, the case 45 still receives an external force after the reception of the position signals in the circuit 90. Therefore, even when the circuit 90 controls the circuits 71 and 72 according to the position signals, the object 40 is moved and shifted from the predetermined position by time-dependent shifted values along the x-axis, the y-axis and the z-axis at a time-dependent speed. Therefore, the position signals extracted in the circuit 96 indicates an external force recently received in the case 45.

The circuit 90 detects acceleration and angular velocity applied to the case 45 from the position signals indicating the positions of the object 40 relative to the groups of electrode pairs and outputs the detected acceleration and angular velocity to external devices.

More specifically, the circuit 90 detects the strength of acceleration in the x-axial direction from the position signal corresponding to the group of electrode pairs 54 and 56, detects the strength of acceleration in the y-axial direction from the position signal corresponding to the group of electrode pairs 50 and 52, and detects the strength of acceleration in the z-axial direction from the position signals corresponding to the group of electrode pairs 71 and 72, the group of electrode pairs 73 and 74, the group of electrode pairs 75 and 76 and the group of electrode pairs 77 and 78.

Further, the circuit 90 detects the level of angular velocity around the x-axis and the level of angular velocity around the y-axis from the position signals corresponding to the group of electrode pairs 71 and 72, the group of electrode pairs 73 and 74, the group of electrode pairs 75 and 76 and the group of electrode pairs 77 and 78.

As described above, the position signals corresponding to the positions of the object 40 relative to the respective groups of electrode pairs indicate the strength of acceleration in the x-axial direction, the strength of acceleration in the y-axial direction, the strength of acceleration in the z-axial direction, the level of angular velocity around the x-axis and the level of angular velocity around the y-axis. These position signals are modulated with the carrier waves in the object 40, and the modulated signals are multiplexed to the input signal Vin. The circuit 96 reproduces the position signals from the input signal Vin. The circuit 90 detects the acceleration and the angular velocity from the position signals.

Therefore, the circuit 90 can control the object 40 according to the extracted position signals to hold the object 40 to the predetermined position (i.e., predetermined position along the x-axis, predetermined position along the y-axis, and predetermined position along the z-axis), and the detector can detect the x-axial acceleration, the y-axial acceleration, the z-axial acceleration, the angular velocity around the x-axis and the angular velocity around the y-axis applied to the case 45 as physical properties.

Next, the precision in the detection of acceleration and angular velocity will be described.

The circuit 90 detects the x-axial acceleration applied to the case 45 by calculating a change in the x-axial position of the object 40 with respect to time. The circuit 90 detects the y-axial acceleration applied to the case 45 by calculating a change in the y-axial position of the object 40 with respect to time. The circuit 90 detects the z-axial acceleration applied to the case 45 by calculating a change in the z-axial positions of the object 40 with respect to time.

In contrast, the circuit 90 detects the angular velocity around the x-axis by calculating the rotational acceleration around the x-axis from z-axial position signals and integrating the rotational acceleration with respect to time. The circuit 90 detects the angular velocity around the y-axis by calculating the rotational acceleration around the y-axis from z-axial position signals and integrating the rotational acceleration with respect to time.

Because the angular velocity is detected by the calculation of the rotational acceleration and the integration of the rotational acceleration with respect to time, it is required to heighten the precision in z-axial position signals reproduced in the circuit 90, as compared with the precision along x-axial position signals and y-axial position signals reproduced.

In this embodiment, the carrier wave $S_5$ having the highest frequency is applied to the electrode pairs 54 and 56 to detect the x-axial acceleration, and the carrier wave $S_6$ having the highest frequency is applied to the electrode pairs 50 and 52 to detect the y-axial acceleration, and the carrier waves $S_1$ to $S_4$ having frequency lower than that of the carrier wave $S_5$ or $S_6$ are applied to the electrode pairs 71 to 78 to detect the angular velocity around the x-axis and the angular velocity around the y-axis in addition to the z-axial acceleration.

Accordingly, because the position signals indicating the positions of the object 40 along z-axis are superimposed onto the carrier waves $S_1$ to $S_4$ having the lowest frequency, the position signals can be extracted with high precision, and the precision in the angular velocity around the x-axis and the precision in the detection of the angular velocity around the y-axis can be appropriately heightened.

In this embodiment, the object 40 is merely put into the case 45. However, it is preferred that the object 40 be compulsorily rotated on its center axis around the z-axis. In this case, the precision in the detection of the angular velocity can be further heightened. For example, driving electrodes are attached to the covers 43 and 44 to apply driving signals to the driving electrodes and to rotate the object 40 around the z-axis. Further, it is preferred that holding members be placed into the case 45 to movably hold the object 40 along the z-axis. In this case, the precision in the detection of the angular velocity can be further heightened.

Further, in this embodiment, the method of transmitting modulated signals multiplexed by frequency division multiplexing is used for the physical quantity detector 100. However, the method may be used for any transmission system in which synchronous detection is performed for a transmitted signal in a receiving end.

Moreover, the physical quantity detector using the method is not limited to the structure according to this embodiment. For example, the detector may have a ring-shaped floating object in place of the disc-shaped floating object 40 to change the structure of the sensor 50.

Modification of Third Embodiment

In the detector 100 according to the third embodiment, the number of groups of electrode pairs 71 to 78 for holding the object 40 along the z-axis is larger than the number of frequencies of the carrier waves $S_1$ and $S_4$ applied to the groups of electrode pairs 71 to 78. Therefore, the frequency of the carrier wave $S_3$ and $S_4$ corresponding to the electrode pairs 75 to 78 is differentiated from the frequency of the carrier wave $S_1$ and $S_2$ corresponding to the electrode pairs 71 to 74. In this case, the precision in the synchronous detection of the carrier wave $S_3$ and $S_4$ becomes different from the precision in the synchronous detection of the carrier wave $S_1$ and $S_2$. As a result, there is a possibility that the precision in the detection of the z-axial acceleration, the precision in the detection of the angular velocity around the x-axis and/or the precision in the detection of the angular velocity around the y-axis could be lowered.

In this modification, the correspondence of the carrier wave $S_1$ to $S_4$ to the electrode pairs 71 to 78 is periodically changed to equalize the precision in the detection corresponding to the electrode pairs 71 and 72, the precision in the detection corresponding to the electrode pairs 73 and 74, the precision in the detection corresponding to the electrode pairs 75 and 76 and the precision in the detection corresponding to the electrode pairs 77 and 78 with one another.

FIG. 19 is a view showing the correspondence of the carrier waves $S_1$ to $S_6$ to the groups of electrode pairs.

As shown in FIG. 19, the circuit 94 changes the correspondence of the carrier wave $S_1$ to $S_4$ to the electrode pairs 71 to 78 every modulation period to rotate or circulate the change in a cycle of four modulation periods. For example, the groups of electrode pairs 71 to 78 circularly receive the carrier wave $S_1$ in that order while being changed every modulation period.

Further, the circuit 94 changes the correspondence of the carrier wave $S_5$ and $S_6$ to the electrode pairs 50 to 54 every modulation period to rotate or circulate the change in a cycle of two modulation periods. For example, the carrier waves $S_5$ and $S_6$ are alternatively applied to the group of electrode pairs 54 and 56 in that order while being changed every modulation period.

Accordingly, the precision in the detection corresponding to the electrode pairs 71 and 72, the precision in the detection corresponding to the electrode pairs 73 and 74, the precision in the detection corresponding to the electrode pairs 75 and 76 and the precision in the detection corresponding to the electrode pairs 77 and 78 can be equalized with one another. In this case, even when the number of groups of electrode pairs 71 to 78 for holding the object 40 along the z-axis is larger than the number of frequencies of carrier waves applied to the groups of electrode pairs 71 to 78, the precision in the detection of the z-axial acceleration, the precision in the detection of the angular velocity around the x-axis and the precision in the detection of the angular velocity around the y-axis can be kept high.

Further, the precision in the detection of the x-axial acceleration can be reliably equalized with the precision in the detection of the y-axial acceleration.

These embodiments should not be construed as limiting the present invention to structures of those embodiments, and the structure of this invention may be combined with that based on the prior art.

What is claimed is:

1. A method of transmitting a plurality of modulated signals, the method comprising:
   modulating a plurality of carrier waves having frequencies, each frequency being set at $½^n$ (n is a variable positive integer such as 0, 1 or 2) of a reference frequency, with respective transmission signals different from one another to produce a plurality of modulated signals having respective modulated carrier waves; and
   sending the modulated signals to a transmission line common to the modulated signals to transmit the modulated signals, multiplexed by frequency division multiplexing, to a synchronous detector in which synchronous detection is performed for the carrier waves by
   receiving the modulated signals of the transmission line as an input signal,
   calculating a moving average of the input signal every sampling period of time equal to one-half or one-fourth of a reference cycle corresponding to the reference frequency, and
   performing an addition and subtraction calculation, corresponding to a cycle of one carrier wave, for the moving averages for each of the carrier waves, wherein
   each of the transmission signals modulates the corresponding carrier wave such that, as the signal level of the transmission signal is lowered, the frequency of the carrier wave modulated with the transmission signal is lowered.

2. The method according to claim 1, wherein the synchronous detector, receiving the input signal through the transmission line, has a pulse delay circuit having
   a plurality of delay units connected in series,
   receives the input signal in the pulse delay circuit as a signal for setting a delay time of each delay unit,
   receives a pulse signal in the pulse delay circuit to transmit the pulse signal while delaying the pulse signal in each of the delay units by the delay time of the delay unit, and
   counts a number of delay units, through which the pulse signal has passed in the pulse delay circuit, every sampling period of time equal to one-half or one-fourth of the reference cycle corresponding to the reference frequency to calculate the moving average of the input signal by using the counted number every sampling period.

3. The method according to claim 2, wherein the carrier waves having different frequencies are used.

4. The method according to claim 2, wherein a plurality of first carrier waves having different frequencies and a plurality of second carrier waves having different frequencies are used as the carrier waves such that each of the first carrier waves has the same frequency as the frequency of one second carrier wave and has a phase shifted by $\pi/2$ radians from a phase of the second carrier wave.

5. The method according to claim 1, wherein the carrier waves having different frequencies are used.

6. The method according to claim 1, wherein a plurality of first carrier waves having different frequencies and a plurality of second carrier waves having different frequencies are used as the carrier waves such that each of the first carrier waves has the same frequency as the frequency of one second carrier wave and has a phase shifted by $\pi/2$ radians from a phase of the second carrier wave.

7. A physical quantity detector comprising:
a case that has an object, capable to electrostatically float, a plurality of force inducing electrodes, the object being positioned by electrostatic forces, and a common electrode receiving a signal from the object;
a control voltage applying circuit that applies a control voltage for controlling the position of the object to each of the force inducing electrodes;
a carrier wave applying circuit that applies a plurality of position detecting carrier waves to the respective force inducing electrodes;
a synchronous detecting circuit that receives signals applied to the object from the force inducing electrodes through the common electrode and performs synchronous detection for the position detecting carrier waves by using the received signals; and
a control circuit that controls the control voltage, to be applied to the force inducing electrodes by the control voltage applying circuit, according to a result of the synchronous detection performed by the synchronous detecting circuit for the position detecting carrier waves to hold the object at a predetermined position and to detect an acceleration and an angular velocity applied to the case from the result of the synchronous detection; wherein
each of frequencies of the position detecting carrier waves is set at $1/2^n$ (n is a variable positive integer such as 0, 1 or 2) of a reference frequency,
the synchronous detecting circuit
has a pulse delay circuit having a plurality of delay units connected in series,
calculates a moving average of the signal received from the common electrode every sampling period of time equal to one-half or one-fourth of a reference cycle corresponding to the reference frequency by
receiving the signal transmitted from the common electrode in the pulse delay circuit as a signal for setting a delay time of each delay unit,
receiving a pulse signal in the pulse delay circuit to transmit the pulse signal while delaying the pulse signal in each of the delay units by the delay time of the delay unit, and
counting a number of delay units, through which the pulse signal has passed in the pulse delay circuit, every sampling period of time equal to one-half or one-fourth of the reference cycle corresponding to the reference frequency, and
performs an addition and subtraction calculation, corresponding to a cycle of one position detecting carrier wave, for the moving averages for each of the position detecting carrier waves to perform synchronous detection for the position detecting carrier waves, and
the carrier wave applying circuit sets frequencies of a first group of position detecting carrier waves used by the control circuit to detect the angular velocity to be lower than frequencies of a second group of position detecting carrier waves used by the control circuit to detect the acceleration.

8. The physical quantity detector according to claim 7, wherein
the force inducing electrodes are classified into three types, respectively, arranged in three axial directions, perpendicular to one another, from the object so as to place the object between force inducing electrodes of each type, the force inducing electrodes arranged in a specific axial direction among the three axial directions from the object are disposed around the specific axial direction so as to detect the angular velocity occurring around the other two axial directions, and
the carrier wave applying circuit applies first position detecting carrier waves to the first type force inducing electrodes such that frequencies of the first position detecting carrier waves are lower than frequencies of the other position detecting carrier waves applied to the other types force inducing electrodes.

9. The physical quantity detector according to claim 8, wherein the carrier wave applying circuit periodically changes the frequency of the position detecting carrier wave applied to each force inducing electrode.

10. The physical quantity detector according to claim 7, wherein the carrier wave applying circuit periodically changes the frequency of the position detecting carrier wave applied to each force inducing electrode.

* * * * *